US012805608B2

(12) United States Patent
Takenaka et al.

(10) Patent No.: US 12,805,608 B2
(45) Date of Patent: Nov. 24, 2026

(54) COVER MEMBER AND LINEAR MOTION GUIDE UNIT

(71) Applicants: YKK CORPORATION, Tokyo (JP); NIPPON THOMPSON CO., LTD., Tokyo (JP)

(72) Inventors: Hideaki Takenaka, Tokyo (JP); Tomoaki Nakamura, Mino (JP); Takafumi Kawashima, Mino (JP)

(73) Assignees: YKK CORPORATION, Tokyo (JP); NIPPON THOMPSON CO., LTD., Tokyo (JP)

( * ) Notice: Subject to any disclaimer, the term of this patent is extended or adjusted under 35 U.S.C. 154(b) by 29 days.

(21) Appl. No.: 18/869,994

(22) PCT Filed: May 11, 2023

(86) PCT No.: PCT/JP2023/017754

§ 371 (c)(1),
(2) Date: Nov. 27, 2024

(87) PCT Pub. No.: WO2023/243269

PCT Pub. Date: Dec. 21, 2023

(65) Prior Publication Data

US 2025/0325074 A1 Oct. 23, 2025

(30) Foreign Application Priority Data

Jun. 17, 2022 (JP) ................................ 2022-097976

(51) Int. Cl.

| | |
|---|---|
| ***A44B 19/24*** | (2006.01) |
| ***F16C 29/06*** | (2006.01) |
| ***F16C 29/08*** | (2006.01) |

(52) U.S. Cl.

CPC ............. *A44B 19/24* (2013.01); *F16C 29/08* (2013.01); *F16C 29/06* (2013.01)

(58) Field of Classification Search

CPC ...... A44B 19/32; A44B 19/382; A44B 19/265

(Continued)

(56) References Cited

U.S. PATENT DOCUMENTS

| | | | | |
|---|---|---|---|---|
| 6,241,230 | B1 | 6/2001 | Kawaguchi | |
| 2003/0177615 | A1* | 9/2003 | Metzger ............... | A44B 19/265 24/415 |
| 2015/0082582 | A1* | 3/2015 | Whiton .................. | A44B 19/26 24/418 |

FOREIGN PATENT DOCUMENTS

| | | | |
|---|---|---|---|
| JP | H02-021024 | A | 1/1990 |
| JP | H0221024 | A * | 1/1990 |

(Continued)

OTHER PUBLICATIONS

Feb. 10, 2026 Office Action issued in Japanese Application No. 2022-097976.

(Continued)

*Primary Examiner* — John Olszewski
*Assistant Examiner* — Aimee Tran Nguyen
(74) *Attorney, Agent, or Firm* — Oliff PLC

(57) ABSTRACT

A cover member includes a longitudinally extending fastener and covers a mechanical element component, including a wall having the fastener arranged thereon and forming a space for accommodating the mechanical element component. The fastener includes a right side element extending along the longitudinal direction, a left side element extending in the longitudinal direction along and engageable with the right, a front slider attached to the elements, and a rear slider attached to the elements and spaced apart from the front slider. During movement of the front and rear sliders, the sliders each disengage the elements from each other while moving in a direction opposite to a side where the other slider is located, and engage the elements with each other while the slider moves in a direction toward the side (Continued)

where the other slider is located. The wall has a hook and loop fastener provided thereon.

15 Claims, 21 Drawing Sheets

(58) Field of Classification Search
USPC ........................................................... 24/381
See application file for complete search history.

(56) References Cited

FOREIGN PATENT DOCUMENTS

| | | | | | |
|---|---|---|---|---|---|
| JP | H02-105639 | U | | 8/1990 | |
| JP | 2000-230618 | A | | 8/2000 | |
| JP | 2007069809 | A | * | 3/2007 | ............. B60N 3/042 |
| WO | WO-2020179955 | A1 | * | 9/2020 | .......... F16C 29/0626 |

OTHER PUBLICATIONS

Jul. 7, 2026 Decision of Refusal issued in Japanese Application No. 2022-097976.

* cited by examiner

COVER MEMBER AND LINEAR MOTION GUIDE UNIT

TECHNICAL FIELD

The present disclosure relates to a cover member and a linear motion guide unit. The present application claims priority based on Japanese Patent Application No. 2022-97976 filed on Jun. 17, 2022, the entire contents of which are incorporated herein by reference.

BACKGROUND ART

A guide apparatus having a dustproof structure in which a portion of a movable body projects outwardly through an opening formed in an outer cover and the movable body moves along the opening is known (see, for example, Patent Literature 1). According to the dustproof guide apparatus disclosed in Patent Literature 1, a plurality of flexible belt-shaped seal members are attached to edge portions of the opening, and the seal members have their end portions overlapping each other.

CITATION LIST

Patent Literature

Patent Literature 1: Japanese Patent Application Laid-Open No. 2000-230618

SUMMARY OF INVENTION

Technical Problem

In order to improve dustproof and waterproof properties, a cover member may be provided for mechanical element components included in a linear motion guide unit, such as a rail and a sliding member, to thereby avoid exposure of the rail and the sliding member as much as possible. Such a cover member, used for improving the sealing of the mechanical element components, is attached to a predetermined location for use. It is desired for the cover member to improve the ease of attachment while ensuring a high level of sealing.

Thus, one of the objects is to provide a cover member capable of improving ease of attachment while ensuring a high level of sealing.

Solution to Problem

A cover member according to the present disclosure includes a longitudinally extending fastener and covers a mechanical element component. The cover member includes a wall having the fastener arranged thereon and forming a space for accommodating the mechanical element component. The fastener includes a right side element extending along the longitudinal direction, a left side element extending in the longitudinal direction along the right side element and engageable with the right side element, a front slider attached to the right side element and the left side element, and a rear slider attached to the right side element and the left side element and spaced apart from the front slider in the longitudinal direction. During movement of the front slider and the rear slider in the longitudinal direction, the front slider and the rear slider each disengage the right side element and the left side element from each other while the slider moves in a direction opposite to a side where the other slider is located, and engage the right side element and the left side element with each other while the slider moves in a direction toward the side where the other slider is located. The wall has a hook and loop fastener provided thereon.

Advantageous Effects of Invention

The cover member described above is capable of improving the ease of attachment while ensuring a high level of sealing.

DESCRIPTION OF EMBODIMENTS

Outline of Embodiments

Figure 1:
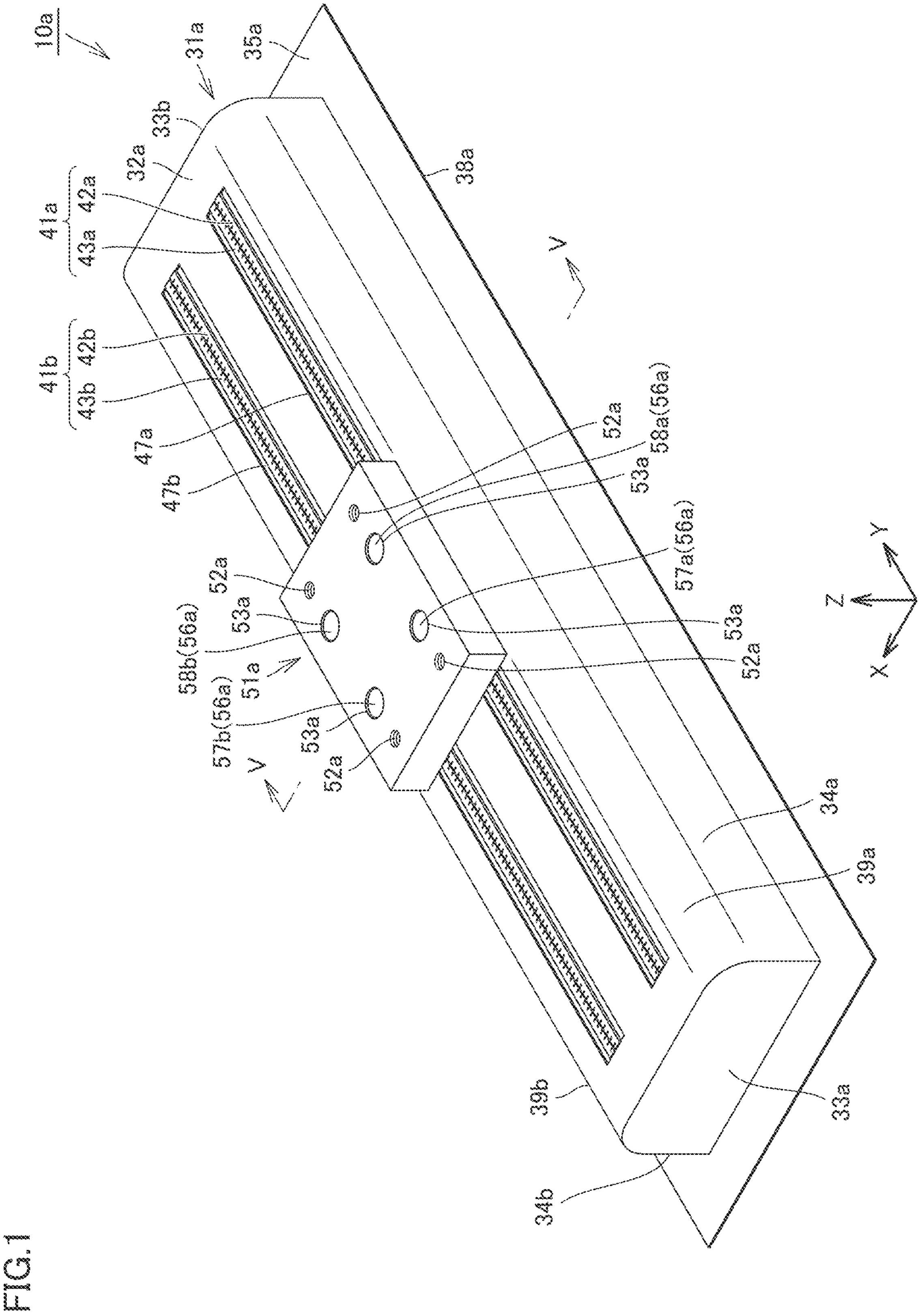
FIG. 1 is a schematic perspective view of a linear motion guide unit including a cover member in Embodiment 1 of the present disclosure.

A cover member of the present disclosure includes a longitudinally extending fastener and covers a mechanical element component. The cover member includes a wall having the fastener arranged thereon and forming a space for accommodating the mechanical element component. The fastener includes a right side element extending along the longitudinal direction, a left side element extending in the longitudinal direction along the right side element and engageable with the right side element, a front slider attached to the right side element and the left side element, and a rear slider attached to the right side element and the left side element and spaced apart from the front slider in the longitudinal direction. During movement of the front slider and the rear slider in the longitudinal direction, the front slider and the rear slider each disengage the right side element and the left side element from each other while the slider moves in a direction opposite to a side where the other slider is located, and engage the right side element and the left side element with each other while the slider moves in a direction toward the side where the other slider is located. The wall has a hook and loop fastener provided thereon.

The cover member of the present disclosure can properly cover the mechanical element component by accommodating the mechanical element component in the space formed by the wall. The wall includes the fastener of the above-described configuration, allowing the fastener to be opened and closed while maintaining a high level of sealing. The wall has the hook and loop fastener provided thereon, which eliminates the need for screws, adhesives, or the like for attaching the cover member, and facilitates positioning. Since the fastening is done on a surface using the hook and loop fastener, a gap is unlikely to occur, and a high level of sealing can be maintained in the space that houses the mechanical element component. Accordingly, such a cover member is capable of improving the ease of attachment while ensuring a high level of sealing. Here, a fastener refers to one having a plurality of teeth (fastener teeth) attached along a longitudinal direction on both sides in a width direction (direction perpendicular to the longitudinal direction) of a cut portion (opening region) extending in the longitudinal direction.

A linear motion guide unit of the present disclosure includes: a rail including a rail upper surface and a rail side surface each extending in a longitudinal direction and having a first raceway surface provided on the rail side surface; a sliding member relatively movably attached to the rail and including a sliding member lower surface facing the rail upper surface and a second raceway surface facing the first raceway surface; a plurality of rolling elements rolling on a load-carrying race constituted by the first and second raceway surfaces; a cover member covering the rail and the sliding member and including a fastener extending in the longitudinal direction; a moving member arranged outside the cover member and moving together with the sliding member; and a connecting member connecting the sliding member to the moving member. The cover member includes a wall having the fastener arranged thereon and forming a space for accommodating the rail and the sliding member. The fastener includes a right side element extending along the longitudinal direction, a left side element extending in the longitudinal direction along the right side element and engageable with the right side element, a front slider attached to the right side element and the left side element and fixed to the sliding member and the moving member, and a rear slider attached to the right side element and the left side element, spaced apart from the front slider in the longitudinal direction, and fixed to the sliding member and the moving member. During movement of the sliding member and the moving member, the front slider and the rear slider each disengage the right side element and the left side element from each other while the slider moves in a direction opposite to a side where the other slider is located, and engage the right side element and the left side element with each other while the slider moves in a direction toward the side where the other slider is located. The connecting member includes a support member arranged between the front slider and the rear slider in the longitudinal direction and supporting the moving member. The wall has a hook and loop fastener provided thereon.

According to the linear motion guide unit of the present disclosure, the cover member covers the rail and the sliding member by accommodating the rail and the sliding member in the space formed by the wall. During operation of the sliding member, i.e., during a linear reciprocating motion of the sliding member, the disengagement and engagement between the right side element and the left side element included in the fastener allow the sliding member to slide while maintaining the state where the rail and the sliding member are covered by the cover member. Thus, it is possible to improve the dustproof and waterproof properties during the sliding of the sliding member. The wall has the hook and loop fastener provided thereon, which eliminates the need for screws, adhesives, or the like for attaching the cover member, and facilitates positioning. Since the fastening is done on a surface using the hook and loop fastener, a gap is unlikely to occur, and a high level of sealing can be maintained in the space that houses the rail and the sliding member. Accordingly, such a linear motion guide unit is capable of improving the ease of attachment while ensuring a high level of sealing of the cover member.

In the linear motion guide unit described above, the wall may include a flat plate portion. The hook and loop fastener may be arranged on one side in a thickness direction of the flat plate portion. With this, at the time of attaching the cover member, the flat plate portion included in the wall can be utilized to properly attach the hook and loop fastener to an installation location. This can further improve the ease of attachment.

In the linear motion guide unit described above, the wall may have an opening communicating with the space. The hook and loop fastener may be arranged to surround the opening. This can further improve the sealing in the cover member. Accordingly, a high level of sealing can be more reliably maintained.

In the linear motion guide unit described above, the wall may include an upper wall portion on which the fastener is arranged, and a side wall portion that extends intersecting the upper wall portion. The hook and loop fastener is attached to the side wall portion. This can reduce the risk of foreign matter such as dust being deposited on a portion where the hook and loop fastener is arranged. Thus, the risk of the foreign matter entering the cover member can be reduced, and the smooth operation of the sliding member can be more reliably ensured.

In the linear motion guide unit described above, at least a portion of the cover member may include a structure made of a plurality of resin materials of different strengths stacked.

Adopting such a configuration makes it possible to maintain high strength while ensuring appropriate flexibility in at least a portion of the cover member. Thus, the risk of interference with the sliding member can be reduced while suppressing collapse of the shape in at least a portion of the cover member.

In the linear motion guide unit described above, at least a portion of the cover member may make an inside visible from an outside. This makes it easier to check the condition of the inside of the cover member, and improves maintainability.

In the linear motion guide unit described above, at least one of the front slider and the rear slider may have a seal member operative to sweep an upper portion of a region in which the right side element and the left side element are engaged. With this, the seal member can reduce the risk of foreign matter deposited on top of the cover member entering the inside of the cover member. Thus, the risk of foreign matter entering the load-carrying race can be reduced, and the smooth operation of the sliding member can be more reliably ensured.

In the linear motion guide unit described above, the wall may include an upper wall portion on which the fastener is arranged, and a side wall portion that extends intersecting the upper wall portion. A portion where the upper wall portion and the side wall portion are connected may be configured with a curved surface. This makes it easier for the cover member itself to be deformed, thereby reducing the risk of the cover member sagging or bulging in the state where the fastener is open. Thus, the risk of interference between the sliding member and the cover member can be reduced, and the smooth operation of the sliding member can be more reliably ensured.

In the linear motion guide unit described above, at least one of the right side element and the left side element may include an oil-containing resin provided at a portion where the elements are engaged with each other. With this, smooth movement of the right side element and the left side element can be promoted, and the smooth operation of the sliding member can be ensured.

Specific Embodiments

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

An embodiment of the present disclosure, Embodiment 1, will first be described. FIG. 1 is a schematic perspective view of a linear motion guide unit including a cover member in Embodiment 1 of the present disclosure. In FIG. 1 and the following figures, the X direction indicates a lateral direction, which is the width direction of the linear motion guide unit, the Y direction indicates the longitudinal direction of the linear motion guide unit, and the Z direction indicates the thickness direction (height direction) of the linear motion guide unit. The X, Y, and Z directions are orthogonal to each other. For the sake of convenience in explanation, the direction indicated by the arrow X is regarded as leftward, the direction opposite to that indicated by the arrow X is regarded as rightward, the direction indicated by the arrow Y is regarded as frontward, the direction opposite to that indicated by the arrow Y is regarded as backward, the direction indicated by the arrow Z is regarded as upward, and the direction opposite to that indicated by the arrow Z is regarded as downward. However, these are only for when the linear motion guide unit is arranged as shown in FIG. 1 and others, and the directions of left and right, up and down, or front and back may change depending on, for example, the mounting situation of the linear motion guide unit.

Figure 2:
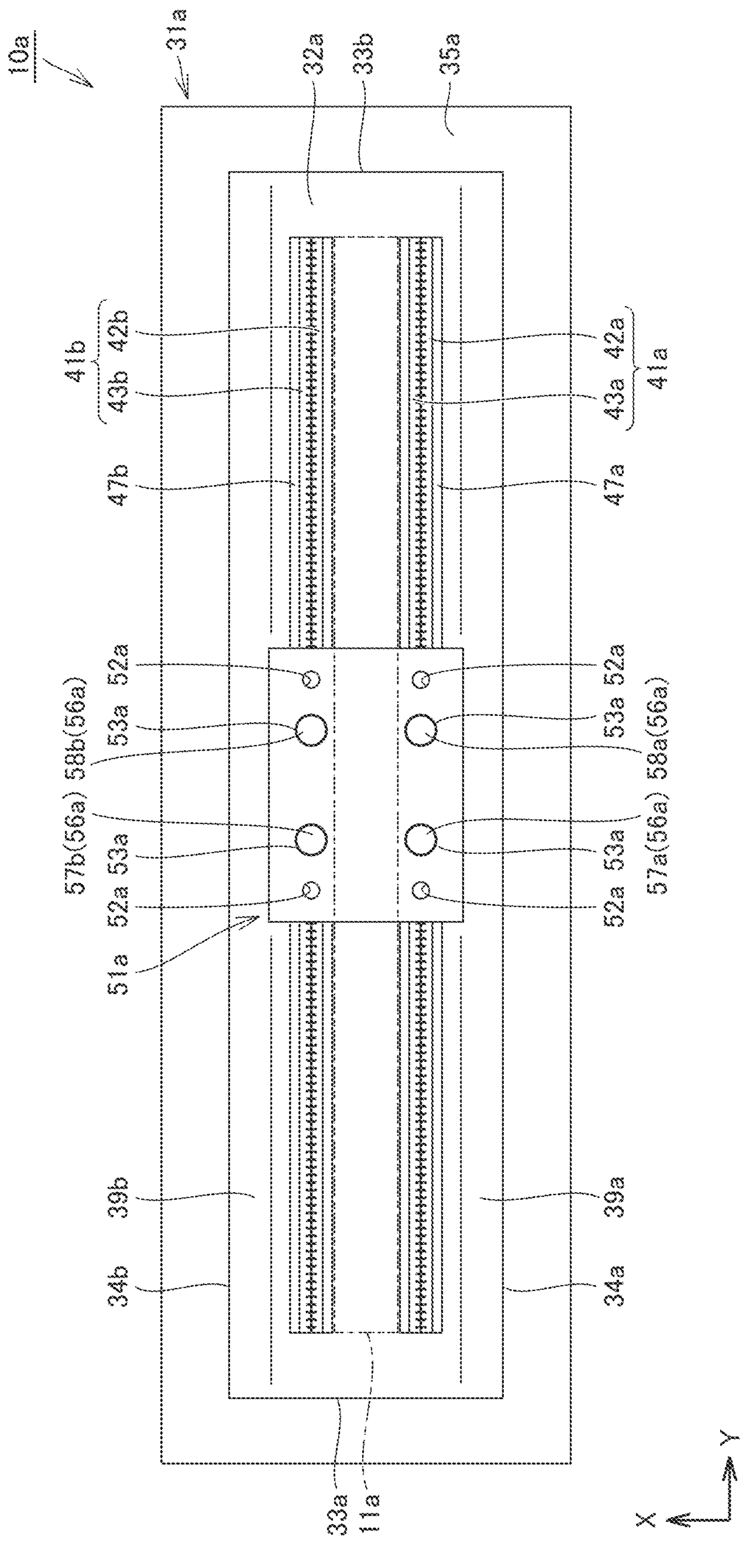
FIG. 2 is a schematic plan view of the linear motion guide unit shown in FIG. 1.
Figure 3:
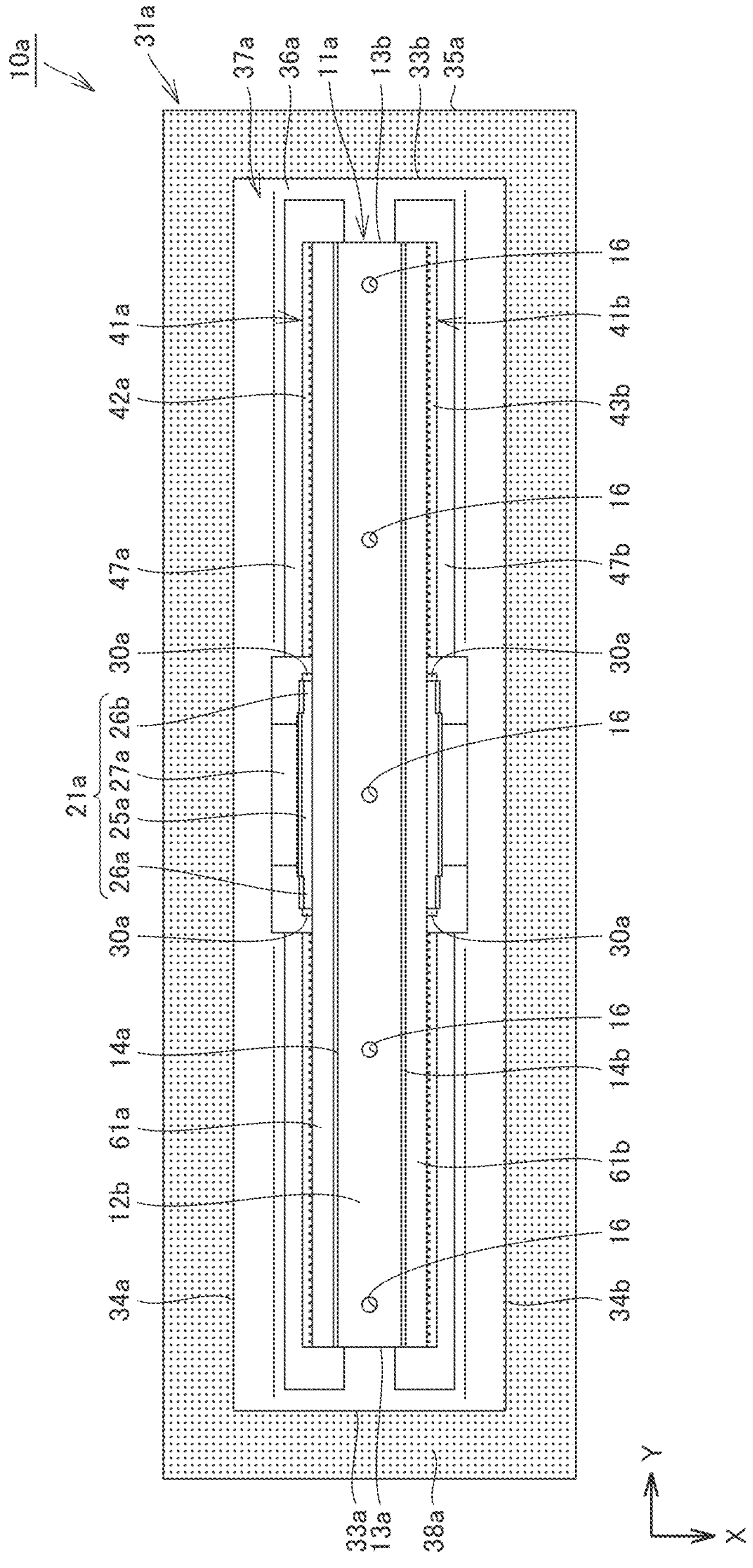
FIG. 3 is a schematic bottom view of the linear motion guide unit shown in FIG. 1.
Figure 4:
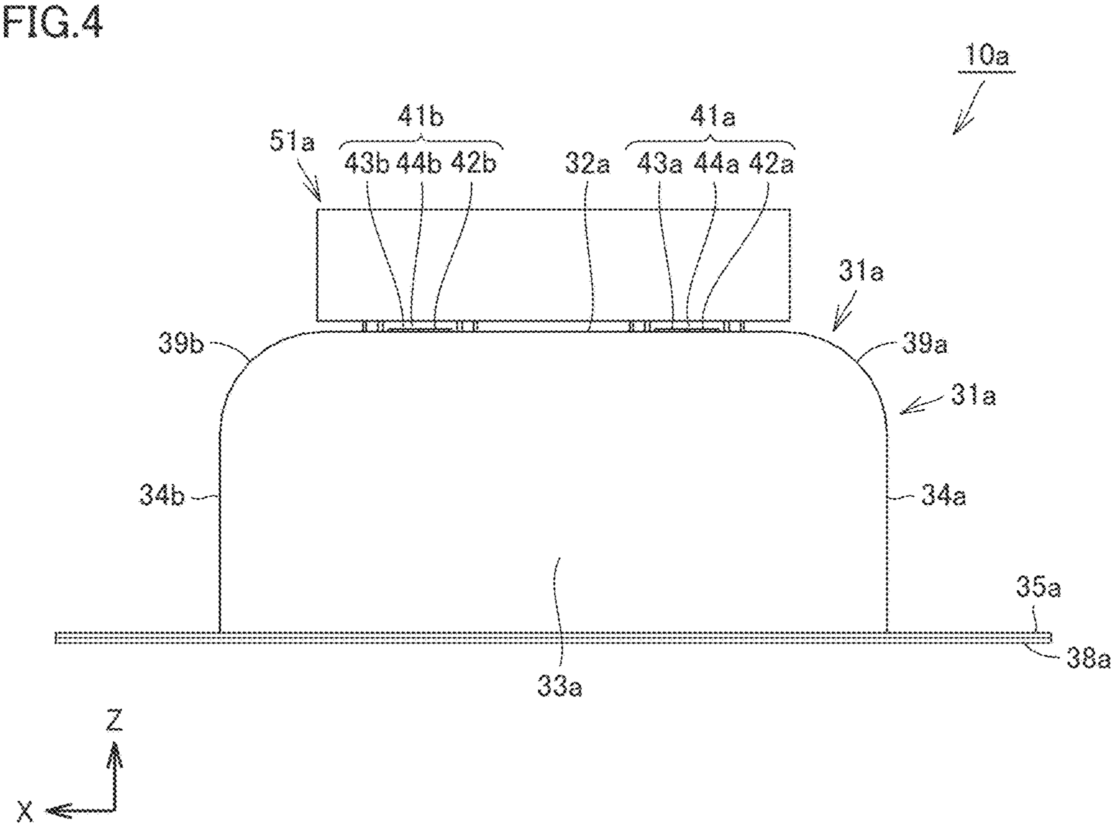
FIG. 4 is a schematic front view of the linear motion guide unit shown in FIG. 1.
Figure 5:
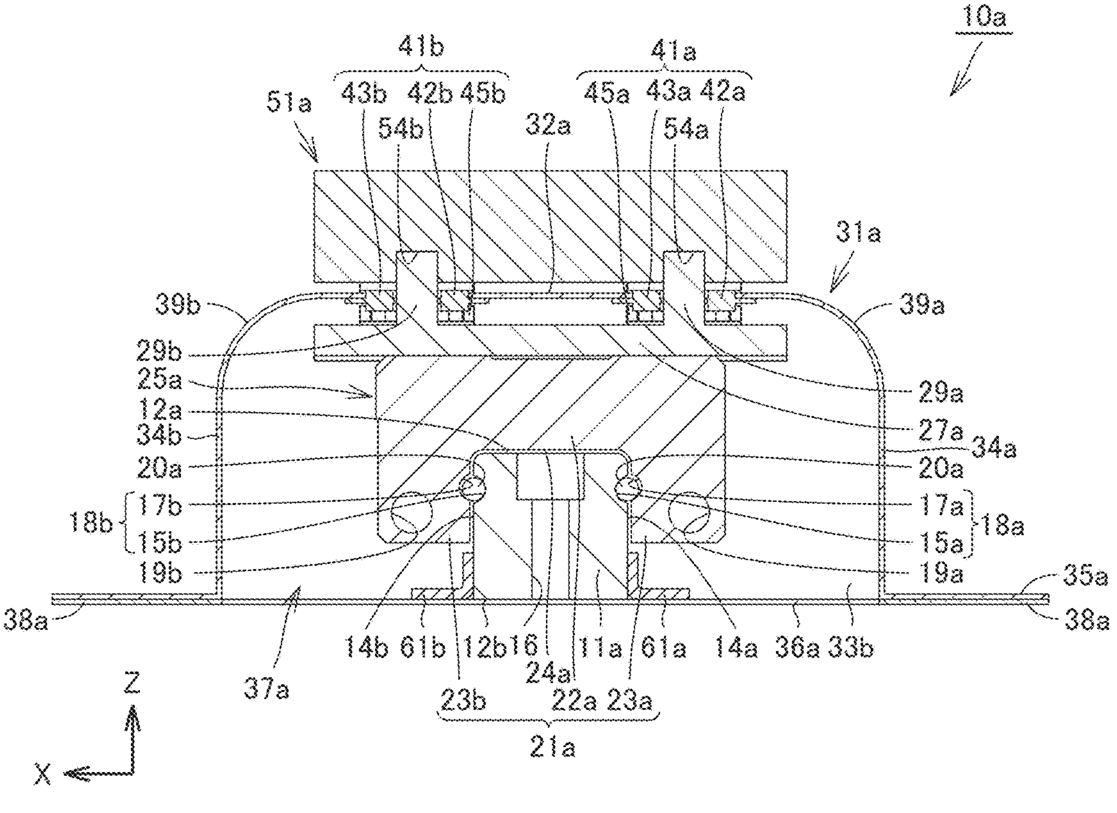
FIG. 5 is a schematic cross-sectional view when cut in a cross section indicated by V-V in FIG. 1.
Figure 6:
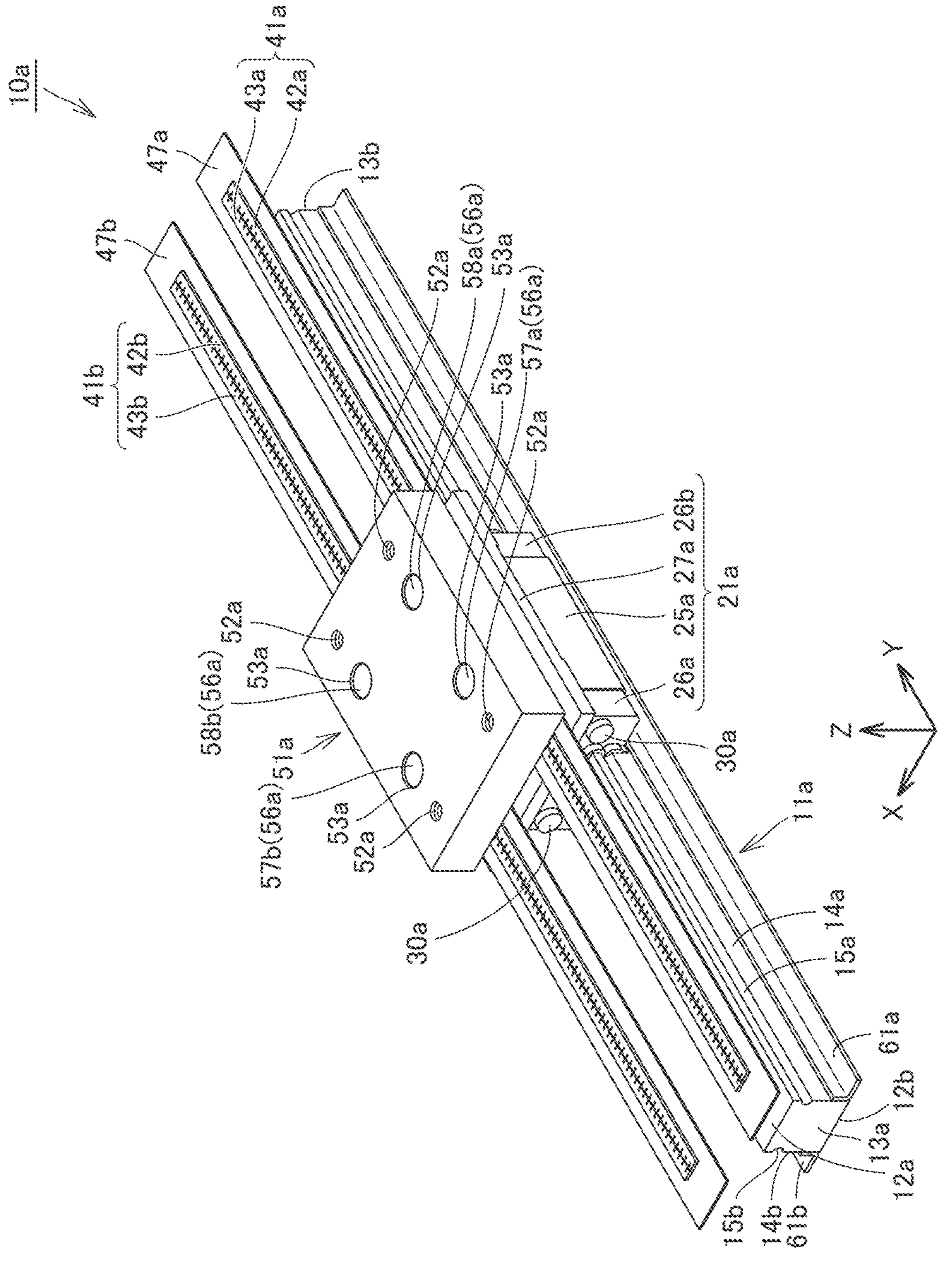
FIG. 6 is a schematic perspective view of the linear motion guide unit shown in FIG. 1, with the illustration of the cover member, described later, partially omitted.
Figure 7:
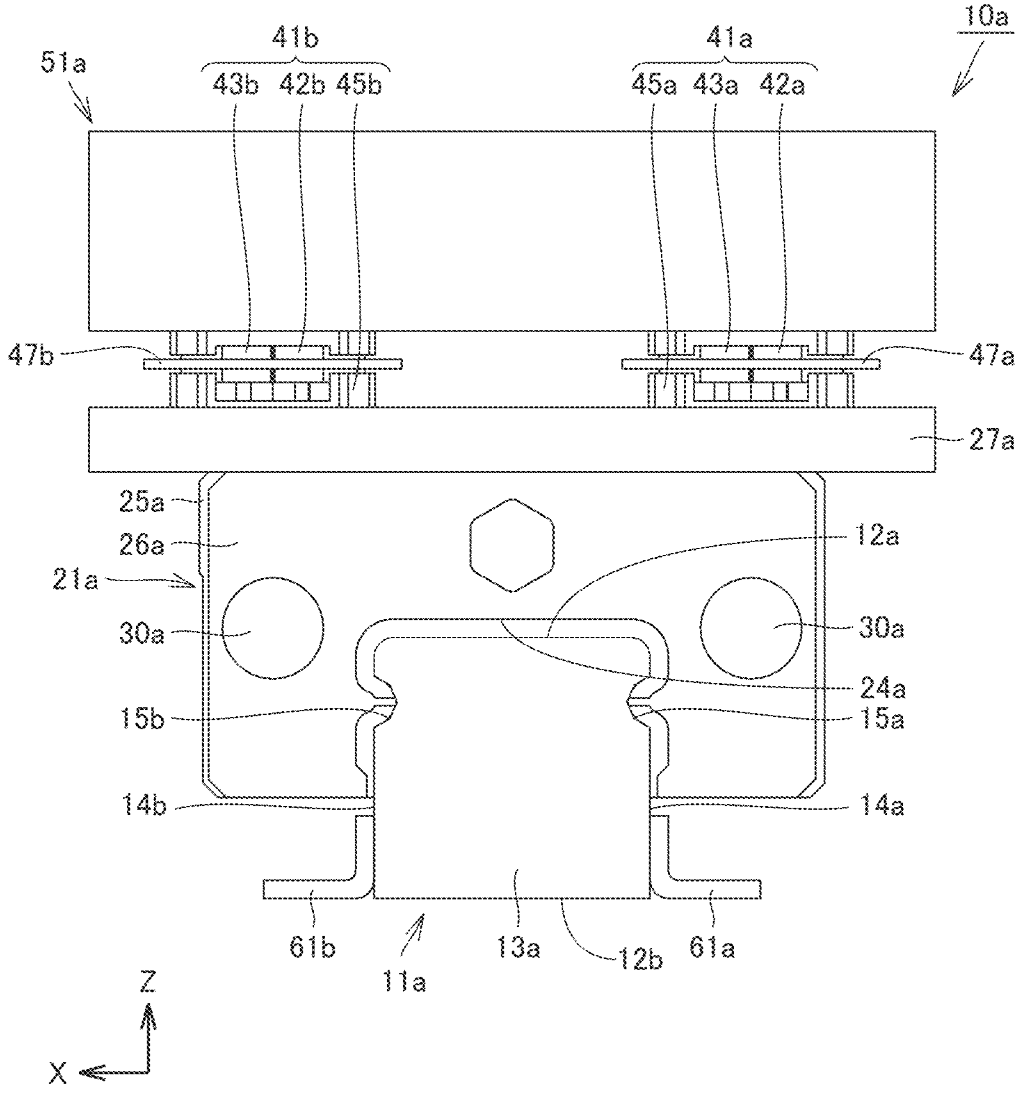
FIG. 7 is a schematic front view of the linear motion guide unit shown in FIG. 6.
Figure 8:
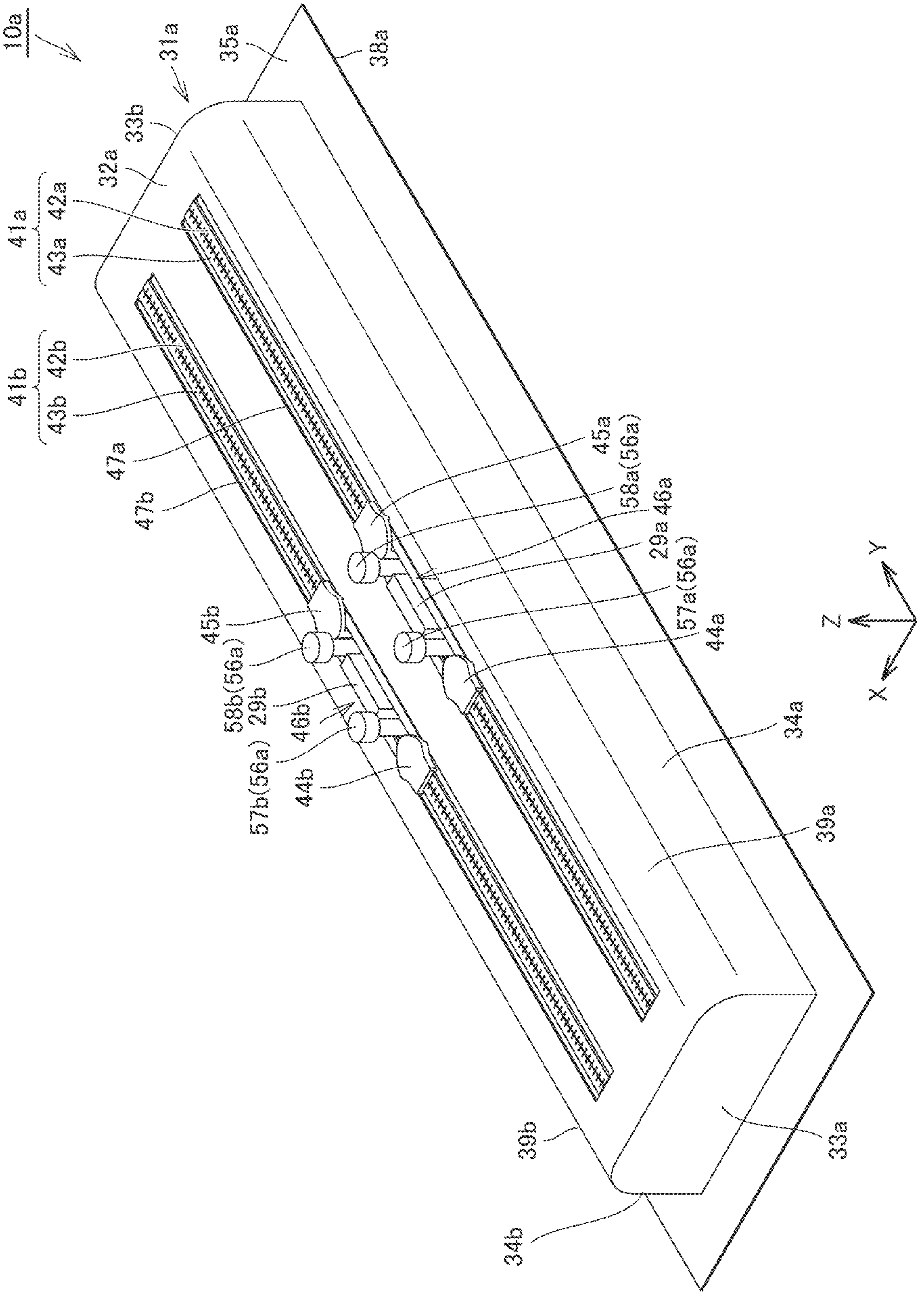
FIG. 8 is a schematic perspective view of the linear motion guide unit shown in FIG. 1, with the illustration of a moving member, described later, omitted.
Figure 9:
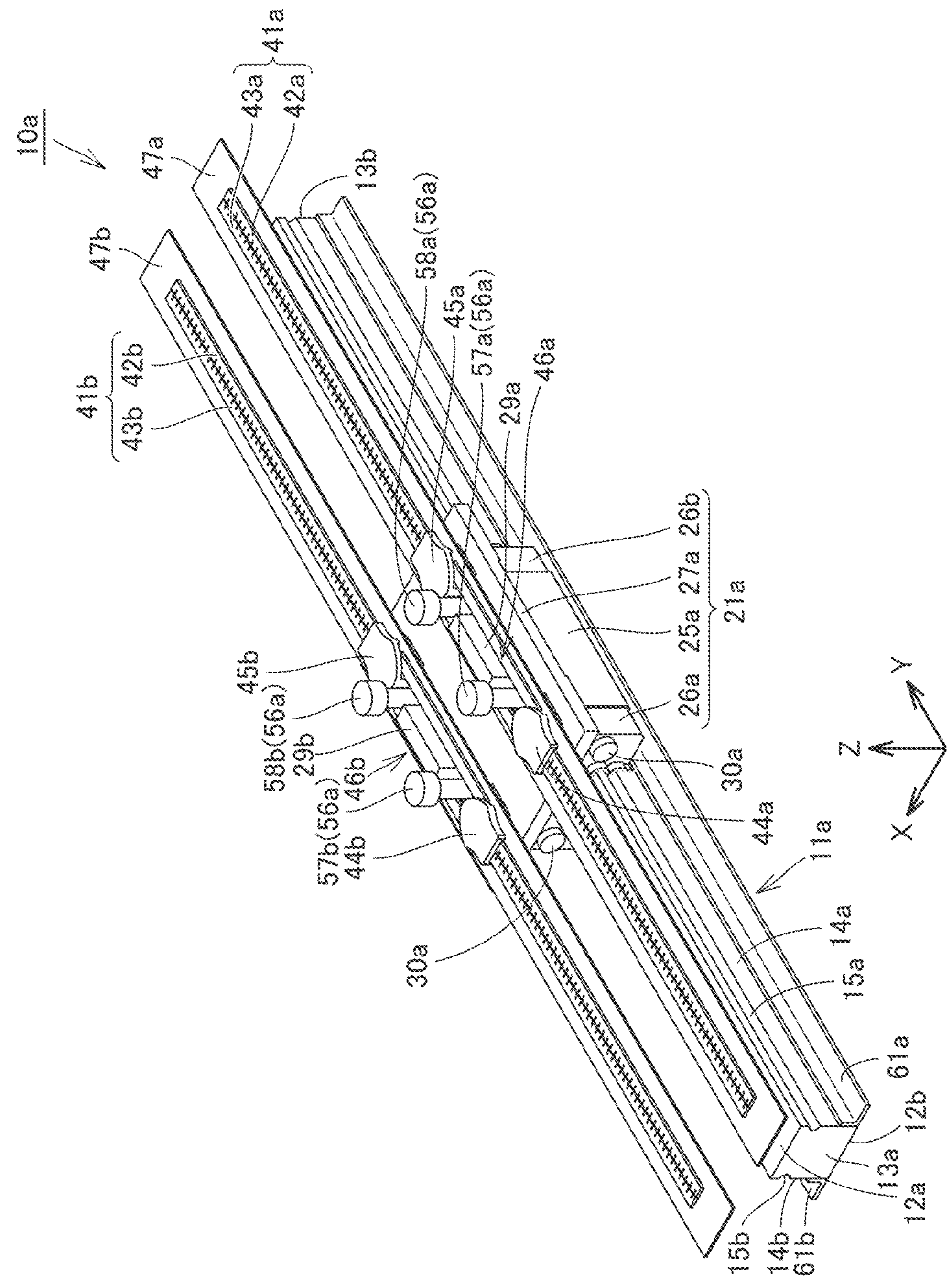
FIG. 9 is a schematic perspective view of the linear motion guide unit shown in FIG. 1, with the illustration of the moving member and a part of the cover member omitted.

FIG. 2 is a schematic plan view of the linear motion guide unit shown in FIG. 1. FIG. 2 is a view of the linear motion guide unit of FIG. 1 in the direction opposite to the direction indicated by the arrow Z. In FIG. 2, the rail is indicated by a long dashed short dashed line. FIG. 3 is a schematic bottom view of the linear motion guide unit shown in FIG. 1. FIG. 3 is a view of the linear motion guide unit of FIG. 1 in the direction indicated by the arrow Z. FIG. 4 is a schematic front view of the linear motion guide unit shown in FIG. 1. FIG. 4 is a view of the linear motion guide unit of FIG. 1 in the direction indicated by the arrow Y. FIG. 5 is a schematic cross-sectional view when cut in a cross section indicated by V-V in FIG. 1. FIG. 6 is a schematic perspective view of the linear motion guide unit shown in FIG. 1, with the illustration of a cover member, described later, partially omitted. FIG. 7 is a schematic front view of the linear motion guide unit shown in FIG. 6. FIG. 8 is a schematic perspective view of the linear motion guide unit shown in FIG. 1, with the illustration of a moving member, described later, omitted. FIG. 9 is a schematic perspective view of the linear motion guide unit shown in FIG. 1, with the illustration of the moving member and a part of the cover member omitted.

Referring to FIGS. 1 to 9, the linear motion guide unit 10*a* according to Embodiment 1 of the present disclosure includes a rail 11*a*, a sliding member 21*a*, balls 20*a* as a plurality of rolling elements, a cover member 31*a*, a moving member 51*a*, and connecting members 56*a*. It should be noted that such a configuration including the balls 20*a* as the rolling elements can reduce the size of the device configuration. The configuration of each member will now be described in detail.

The rail 11*a* includes a rail upper surface 12*a* and a rail lower surface 12*b* spaced apart from each other in the Z direction, a rail front surface 13*a* and a rail back surface 13*b* spaced apart from each other in the Y direction, and rail side surfaces 14*a* and 14*b* on both sides of the rail 11*a* spaced apart from each other in the X direction. The rail side surface 14*a* is located on the right side of the rail 11*a*, and the rail side surface 14*b* is located on the left side of the rail 11*a*. The rail 11*a* includes first raceway surfaces 15*a* and 15*b* provided on the rail side surfaces 14*a* and 14*b*, respectively, and extending parallel to each other along the longitudinal direction. In other words, the first raceway surfaces 15*a* and 15*b* are arranged on the rail side surfaces 14*a* and 14*b*, respectively. The first raceway surfaces 15*a* and 15*b* are each recessed in a groove shape. The first raceway surfaces 15*a* and 15*b* are each recessed in a semicircular arc shape as viewed in the Y direction along the outer shape of the balls 20*a* as the rolling elements.

The rail 11*a* has a plurality of through holes 16 provided to penetrate in the Z direction from the rail upper surface 12*a* to the rail lower surface 12*b* (see in particular FIG. 3). The plurality of through holes 16 are spaced apart from each other in the Y direction. The through holes 16 are effectively utilized, for example, to mount the rail 11*a* at a predetermined location at the time of use of the linear motion guide unit 10*a*.

The configuration of the sliding member 21*a* will now be described. The sliding member 21*a* is relatively movably attached to the rail 11*a*. The sliding member 21*a* includes a pair of sleeve portions 23*a* and 23*b* arranged on both sides in the width direction of the rail 11*a*, and a base portion 22*a* connected to the respective sleeve portions 23*a* and 23*b*. The pair of sleeve portions 23*a* and 23*b* are spaced apart from each other in the X direction. The base portion 22*a* includes a sliding member lower surface 24*a* that faces the rail upper surface 12*a* when the sliding member 21*a* is attached to the rail 11*a* (see in particular FIG. 5). The sliding member 21*a* is slidably straddled on the rail 11*a*. In the present embodiment, the sliding member 21*a* is attached so as to straddle the rail 11*a* and is movable in the Y direction.

The sliding member 21*a* includes a carriage 25*a*, a front end cap 26*a*, a rear end cap 26*b*, and an intermediate member 27*a*. The carriage 25*a* has a rectangular outer shape as viewed in the Z direction. The carriage 25*a* includes second raceway surfaces 17*a* and 17*b* facing the first raceway surfaces 15*a* and 15*b*, respectively (see in particular FIG. 5). The second raceway surfaces 17*a* and 17*b* extend in parallel along the longitudinal direction and are each recessed in a groove shape. The second raceway surfaces 17*a* and 17*b* are recessed in a semicircular arc shape as viewed in the Y direction along the outer shape of the balls 20*a*. The first raceway surface 15*a* and the second raceway surface 17*a* constitute a load-carrying race 18*a* on which the balls 20*a* roll. The first raceway surface 15*b* and the second raceway surface 17*b* constitute a load-carrying race 18*b* on which the balls 20*a* roll.

The carriage 25*a* has return passages 19*a* and 19*b* provided parallel to the load-carrying races 18*a* and 18*b*, respectively. The return passages 19*a* and 19*b* extend in the longitudinal direction (Y direction), and the balls 20*a* move in the return passages 19*a* and 19*b*.

The front end cap 26*a* is attached with bolts 30*a* to one side in the longitudinal direction of the carriage 25*a*, specifically to the rail front surface 13*a* side of the carriage 25*a* in the longitudinal direction. The front end cap 26*a* has turnaround passages (not shown) for changing the direction of the balls 20*a*. The rear end cap 26*b* is attached to the other side in the longitudinal direction of the carriage 25*a*, specifically to the rail back surface 13*b* side of the carriage 25*a* in the longitudinal direction, with bolts 30*a*. The rear end cap 26*b* has turnaround passages (not shown) for changing the direction of the balls 20*a*. The turnaround passages connect the load-carrying race 18*a* to the return passage 19*a* and the load-carrying race 18*b* to the return passage 19*b*. A plurality of balls 20*a* circulate through the load-carrying race 18*a*, the turnaround passage provided in the front end cap 26*a*, the return passage 19*a*, and the turnaround passage provided in the rear end cap 26*b*. A plurality of balls 20*a* circulate through the load-carrying race 18*b*, the turnaround passage provided in the front end cap 26*a*, the return passage 19*b*, and the turnaround passage provided in the rear end cap 26*b*.

The carriage 25*a* is provided with a plurality of, specifically four, mounting holes (not shown) spaced apart from each other in the X and Y directions. These mounting holes are utilized by the connecting members 56*a* to connect the sliding member 21*a* including the carriage 25*a* to the moving member 51*a*.

The intermediate member 27*a* is plate-shaped, and rectangular as viewed in the Z direction. In the Z direction, the intermediate member 27*a* is arranged between the carriage 25*a*, the front end cap 26*a*, and the rear end cap 26*b* on the one hand and an upper wall portion 32*a*, described later, of the cover member 31*a* on the other hand. The intermediate member 27*a* is fixed to the carriage 25*a*. The intermediate member 27*a* is provided so as to be slidable together with the carriage 25*a*, the front end cap 26*a*, and the rear end cap 26*b*. The intermediate member 27*a* is provided with a pair of positioning projections 29*a* and 29*b* projecting in the thickness direction (Z direction). The pair of positioning projections 29*a* and 29*b* are spaced apart from each other in the X direction. The pair of positioning projections 29*a* and 29*b* each have a shape extending in the Y direction. These positioning projections 29*a* and 29*b* are utilized for positioning the moving member 51*a* when the intermediate member 27*a* and the moving member 51*a* are connected.

The configuration of the cover member 31*a* covering the rail 11*a* and the sliding member 21*a* will now be described. The cover member 31*a* includes a wall forming a space 37*a* for accommodating the rail 11*a* and the sliding member 21*a* as the mechanical element components. Specifically, the cover member 31*a* includes an upper wall portion 32*a*, a front side wall portion 33*a*, a back side wall portion 33*b*, a right side wall portion 34*a*, a left side wall portion 34*b*, and a flat plate portion 35*a*. The upper wall portion 32*a*, the front side wall portion 33*a*, the back side wall portion 33*b*, the right side wall portion 34*a*, and the left side wall portion 34*b* form the space 37*a* in which the rail 11*a* and the sliding member 21*a* as the mechanical element components are accommodated. The front side wall portion 33*a* is a side wall portion located on the front side, the back side wall portion 33*b* is a side wall portion located on the back side, the right side wall portion 34*a* is a side wall portion located on the right side, and the left side wall portion 34*b* is a side wall portion located on the left side. The cover member 31*a* has a rectangular outer shape which is longer in the longitudinal direction (Y direction) than in the lateral direction (X direction) as viewed in the thickness direction (Z direction) of the flat plate portion 35*a*. The flat plate portion 35*a* has an opening 36*a* provided at the center, which communicates with the space 37*a*. The front side wall portion 33*a*, the back side wall portion 33*b*, the right side wall portion 34*a*, and the left side wall portion 34*b* are provided so as to rise from the flat plate portion 35*a*. The front side wall portion 33*a*, the back side wall portion 33*b*, the right side wall portion 34*a*, and the left side wall portion 34*b* are each connected to the upper wall portion 32*a* and extend in a direction intersecting the upper wall portion 32*a*. In the present embodiment, the front side wall portion 33*a*, the back side wall portion 33*b*, the right side wall portion 34*a*, and the left side wall portion 34*b* are provided so as to rise perpendicularly in the thickness direction (Z direction) of the flat plate portion 35*a*. The front side wall portion 33*a* and the back side wall portion 33*b* are spaced apart from each other in the Y direction. The right side wall portion 34*a* and the left side wall portion 34*b* are spaced apart from each other in the X direction. The upper wall portion 32*a* is arranged connected to the front side wall portion 33*a*, the back side wall portion 33*b*, the right side wall portion 34*a*, and the left side wall portion 34*b*. The upper wall portion 32*a* is arranged to be parallel to the flat plate portion 35*a*, spaced apart in the Z direction. The flat plate portion 35*a* is configured in a so-called flange shape, and is provided to extend outwardly with respect to the front side wall portion 33*a*, the back side wall portion 33*b*, the right side wall portion 34*a*, and the left side wall portion 34*b* in the X-Y plane, i.e., to extend to the side opposite to the side where the opening 36*a* is located.

A portion 39*a* at which the upper wall portion 32*a* and the right side wall portion 34*a* are connected is configured with a curved surface. Similarly, a portion 39*b* at which the upper wall portion 32*a* and the left side wall portion 34*b* are connected is configured with a curved surface. In the present embodiment, the portion 39*a* where the upper wall portion 32*a* and the right side wall portion 34*a* are connected and the portion 39*b* where the upper wall portion 32*a* and the left side wall portion 34*b* are connected each constitute a rounded surface (R surface) when the linear motion guide unit 10*a* is viewed from the front (in the Y direction). The cover member 31*a* covers the rail 11*a* and the sliding member 21*a* in the space 37*a* surrounded by the upper wall portion 32*a*, the front side wall portion 33*a*, the back side wall portion 33*b*, the right side wall portion 34*a*, and the left side wall portion 34*b*. This makes it easier for the cover member 31*a* itself to be deformed, thereby reducing the risk of the cover member 31*a* sagging or bulging in the state where a first fastener 41*a* or a second fastener 41*b*, described later, is open. Therefore, the risk of interference between the sliding member 21*a* and the cover member 31*a* can be reduced, and the smooth operation of the sliding member 21*a* can be more reliably ensured.

At least a portion of the cover member 31*a* has a structure made of a plurality of resin materials of different strengths stacked. Specifically, the cover member 31*a* is made entirely of urethane rubber, for example. Then, urethane tarpaulin, hot-melt sheet, or the like can be attached to a portion of the cover member 31*a*, the flat plate portion 35*a*, by gluing or welding, to thereby maintain high strength while ensuring appropriate flexibility in the flat plate portion 35*a*. In other words, the region where the flat plate portion 35*a* is located has a structure in which urethane rubber, urethane tarpaulin, and a hook and loop fastener 38*a*, which will be described later, are stacked. Thus, the risk of interference with the sliding member 21*a* can be reduced while the collapse of the shape can be suppressed in at least a portion of the cover member 31*a*, the flat plate portion 35*a*. As for the material for at least a portion of the cover member 31*a*, the region between a first left side element 43*a* and a second right side element 42*b*, which will be described later, may be composed of an elastic body other than urethane rubber.

The linear motion guide unit 10*a* includes shielding members 61*a* and 61*b*. The shielding members 61*a* and 61*b* each have a shape obtained by bending a plate-shaped member into an L shape and are provided so as to extend in the longitudinal direction. The shielding member 61*a* is attached to the rail side surface 14*a* and is arranged between the rail side surface 14*a* and a first opening region 46*a* of a first fastener 41*a*, described later, as viewed from the rail upper surface 12*a* side in a direction perpendicular to the longitudinal direction. The shielding member 61*b* is attached to the rail side surface 14*b* and is arranged between the rail side surface 14*b* and a second opening region 46*b* of a second fastener 41*b*, described later, as viewed from the rail upper surface 12*a* side in the direction perpendicular to the longitudinal direction.

The cover member 31*a* includes fasteners (a first fastener 41*a* and a second fastener 41*b*) each extending in the longitudinal direction (Y direction). The first fastener 41*a* and the second fastener 41*b* are each provided on the upper wall portion 32*a*. Specifically, the first fastener 41*a* is formed on a first tape member 47*a*, and the first tape member 47*a* with the first fastener 41*a* formed thereon constitutes a portion of the upper wall portion 32*a* of the cover member 31*a*. The second fastener 41*b* is formed on a second tape member 47*b*, and the second tape member 47*b* with the second fastener 41*b* formed thereon constitutes a portion of the upper wall portion 32*a* of the cover member 31*a*. The first fastener 41*a* and the second fastener 41*b* are arranged in parallel, spaced apart in the X direction. The first fastener 41*a* is provided on the right side with respect to the second fastener 41*b*. That is, in the present embodiment, two rows of fasteners are provided to extend in the longitudinal direction, spaced apart in the lateral direction.

The configuration of the first fastener 41*a* will now be described. The first fastener 41*a* includes a first right side element 42*a*, a first left side element 43*a*, a first front slider 44*a*, and a first rear slider 45*a*. The first right side element 42*a* extends along the longitudinal direction. The first left side element 43*a* is provided to extend in the longitudinal direction along the first right side element 42*a*. That is, the first right side element 42*a* and the first left side element 43*a* are disposed adjacent to each other in the X direction. The first left side element 43*a* is configured to be engageable with the first right side element 42*a*. The first front slider 44*a* is attached to the first right side element 42*a* and the first left side element 43*a*. The first front slider 44*a* is fixed to the sliding member 21*a*, specifically to the intermediate member 27*a*. The first rear slider 45*a*, similarly to the first front slider 44*a*, is attached to the first right side element 42*a* and the first left side element 43*a*. The first rear slider 45*a* is positioned apart from the first front slider 44*a* in the longitudinal direction (Y direction). The first rear slider 45*a*, similarly to the first front slider 44*a*, is fixed to the sliding member 21*a*, specifically to the intermediate member 27*a*.

During movement of the sliding member 21*a*, the first front slider 44*a* and the first rear slider 45*a* each disengage the first right side element 42*a* and the first left side element 43*a* from each other while the slider moves in a direction opposite to a side where the other slider is located, and engage the first right side element 42*a* and the first left side element 43*a* with each other while the slider moves in a direction toward the side where the other slider is located. A first opening region 46*a* is formed between the first front slider 44*a* and the first rear slider 45*a* in the longitudinal direction, which region is created when the first right side element 42*a* and the first left side element 43*a* are disengaged (see in particular FIGS. 8 and 9). In this first opening region 46*a*, first support members 57*a* and 58*a*, which will be described later, are arranged. It should be noted that the moving member 51*a* is arranged above this first opening region 46*a*, so that the first opening region 46*a* is not visible from the outside, in particular from the Z direction.

The configuration of the second fastener 41*b* will now be described. The second fastener 41*b* includes a second right side element 42*b*, a second left side element 43*b*, a second front slider 44*b*, and a second rear slider 45*b*. The second right side element 42*b* extends along the longitudinal direction. Specifically, the second fastener 41*b* is arranged such that the first left side element 43*a* of the first fastener 41*a* and the second right side element 42*b* of the second fastener 41*b* are spaced apart and adjacent to each other in the X direction. The second left side element 43*b* is provided to extend in the longitudinal direction along the second right side element 42*b*. That is, the second right side element 42*b* and the second left side element 43*b* are disposed adjacent to each other in the X direction. The second left side element 43*b* is configured to be engageable with the second right side element 42*b*. The second front slider 44*b* is attached to the second right side element 42*b* and the second left side element 43*b*. The second front slider 44*b* is fixed to the sliding member 21*a*, specifically to the intermediate member 27*a*. The second rear slider 45*b*, similarly to the second front slider 44*b*, is attached to the second right side element 42*b* and the second left side element 43*b*. The second rear slider 45*b* is positioned apart from the second front slider 44*b* in the longitudinal direction (Y direction). The second rear slider 45*b*, similarly to the second front slider 44*b*, is fixed to the sliding member 21*a*, specifically to the intermediate member 27*a*.

During movement of the sliding member 21*a*, the second front slider 44*b* and the second rear slider 45*b* each disengage the second right side element 42*b* and the second left side element 43*b* from each other while the slider moves in a direction opposite to a side where the other slider is located, and engage the second right side element 42*b* and the second left side element 43*b* with each other while the slider moves in a direction toward the side where the other slider is located. A second opening region 46*b* is formed between the second front slider 44*b* and the second rear slider 45*b* in the longitudinal direction, which region is created when the second right side element 42*b* and the second left side element 43*b* are disengaged (see in particular FIGS. 8 and 9). In this second opening region 46*b*, second support members 57*b* and 58*b*, which will be described later, are arranged. It should be noted that the moving member 51*a* is arranged above this second opening region 46*b* as well, so that the second opening region 46*b* is not visible from the outside, in particular from the Z direction.

The moving member 51*a* is plate-shaped. The moving member 51*a* has a rectangular outer shape as viewed in the Z direction. The moving member 51*a* is disposed outside the cover member 31*a*. Specifically, the moving member 51*a* is disposed above the upper wall portion 32*a* of the cover member 31*a*. The moving member 51*a* is arranged to straddle the two rows of the first fastener 41*a* and the second fastener 41*b*. The moving member 51*a* is provided with a plurality of attachment holes 52*a*. These attachment holes 52*a* are utilized for attaching a conveying member (not shown) which is conveyed together with the moving member 51*a*. The moving member 51*a* is provided with a plurality of connection holes 53*a* for connecting the member to the sliding member 21*a*, specifically to the intermediate member 27*a* included in the sliding member 21*a*. In the present embodiment, a total of four connection holes 53*a* are provided spaced apart from each other in the X and Y directions. The moving member 51*a* is also provided with a pair of receiving recesses 54*a* and 54*b* recessed inwardly from a lower surface located on the rail 11*a* side (see in particular FIG. 5). These receiving recesses 54*a* and 54*b* are shaped to receive the pair of positioning projections 29*a* and 29*b*, respectively, provided in the intermediate member 27*a*. The moving member 51*a* is connected and fixed to the intermediate member 27*a* included in the sliding member 21*a* through the connection holes 53*a* and the receiving recesses 54*a* and 54*b*, by utilizing the connecting members 56*a*, specifically first support members 57*a*, 58*a* and second support members 57*b*, 58*b*.

The connecting members 56*a* connect the sliding member 21*a* to the moving member 51*a*. The connecting members 56*a* include the first support members 57*a*, 58*a* and the second support members 57*b*, 58*b*. The first support members 57*a* and 58*a* each have a bolt shape extending in the Z direction. The first support members 57*a* and 58*a* are disposed apart from each other in the longitudinal direction. The first support members 57*a* and 58*a* are each disposed between the first front slider 44*a* and the first rear slider 45*a* in the longitudinal direction. Specifically, the first support members 57*a* and 58*a* are arranged in the first opening region 46*a* described above. In other words, the sliding member 21*a* covered by the cover member 31*a* and the moving member 51*a* disposed outside the cover member 31*a* can be connected by the first support members 57*a* and 58*a* via the first opening region 46*a*. The second support members 57*b* and 58*b* each have a bolt shape extending in the Z direction. The second support members 57*b* and 58*b* are disposed apart from each other in the longitudinal direction. The second support members 57*b* and 58*b* are each disposed between the second front slider 44*b* and the second rear slider 45*b* in the longitudinal direction. Specifically, the second support members 57*b* and 58*b* are arranged in the second opening region 46*b* described above. In other words, the sliding member 21*a* covered by the cover member 31*a* and the moving member 51*a* disposed outside the cover member 31*a* can be connected by the second support members 57*b* and 58*b* via the second opening region 46*b*. In the present embodiment, the moving member 51*a* is supported by the first support members 57*a*, 58*a* and the second support members 57*b*, 58*b*.

As viewed from the rail upper surface 12*a* side in the direction perpendicular to the longitudinal direction, the first opening region 46*a* created when the first right side element 42*a* and the first left side element 43*a* are separated from each other is placed in a position avoiding the rail 11*a*. In other words, the first opening region 46*a* is in a position that does not overlap the rail 11*a* as viewed in the Z direction. In the present embodiment, as viewed from the rail upper surface 12*a* side in the direction perpendicular to the longitudinal direction, the first fastener 41*a* is placed in a position avoiding the rail 11*a*. Similarly, as viewed from the rail upper surface 12*a* side in the direction perpendicular to the longitudinal direction, the second opening region 46*b* created when the second right side element 42*b* and the second left side element 43*b* are separated from each other is placed in a position avoiding the rail 11*a*. In other words, the second opening region 46*b* is in a position that does not overlap the rail 11*a* as viewed in the Z direction. In the present embodiment, as viewed from the rail upper surface 12*a* side in the direction perpendicular to the longitudinal direction, the second fastener 41*b* is placed in a position avoiding the rail 11*a*. More specifically, as viewed from the rail upper surface 12*a* side in the direction perpendicular to the longitudinal direction, the rail 11*a* is arranged between the first opening region 46*a* and the second opening region 46*b* in the X direction.

The specific configuration of the cover member 31*a* will now be described. The cover member 31*a* includes a hook and loop fastener 38*a*. Specifically, the hook and loop fastener 38*a* is provided on the flat plate portion 35*a* included in the wall. In the present embodiment, the hook and loop fastener 38*a* is disposed on one side in the thickness direction of the flat plate portion 35*a*. In this case, the hook and loop fastener 38*a* is disposed on the rail lower surface 12*b* side of the rail 11*a*. The hook and loop fastener 38*a* is disposed so as to surround the opening 36*a*. Specifically, the hook and loop fastener 38*a* is disposed over the entire area of the flat plate portion 35*a*. To attach the cover member 31*a*, the hook and loop fastener 38*a* of the cover member 31*a* is fitted to a hook and loop fastener (not shown) similarly provided at an installation location to thereby attach the cover member 31*a*. In this manner, the cover member 31*a* is fixed to a predetermined installation location. Such attachment using the hook and loop fastener 38*a* provides a freely detachable configuration.

According to the linear motion guide unit 10*a* of the present disclosure, the rail 11*a* and the sliding member 21*a* are accommodated in the space 37*a* formed by the upper wall portion 32*a*, the front side wall portion 33*a*, the back side wall portion 33*b*, the right side wall portion 34*a*, and the left side wall portion 34*b*, so that the cover member 31*a* covers the rail 11*a* and the sliding member 21*a*. During operation of the sliding member 21*a*, i.e., during a linear reciprocating motion of the sliding member 21*a*, the disengagement and engagement of the first right side element 42*a* and the first left side element 43*a* included in the first fastener 41*a* allow the sliding member 21*a* to slide while maintaining the state where the rail 11*a* and the sliding member 21*a* are covered by the cover member 31*a*. This improves the dustproof and waterproof properties during sliding of the sliding member 21*a*. Furthermore, the flat plate portion 35*a* is provided with the hook and loop fastener 38*a*, which eliminates the need for screws, adhesives, or the like for attaching the cover member 31*a*, and facilitates positioning. Since the fastening is done on a surface using the hook and loop fastener 38*a*, a gap is unlikely to occur, and a high level of sealing is maintained in the space 37*a* in which the rail 11*a* and the sliding member 21*a* are housed. Accordingly, the linear motion guide unit 10*a* described above is capable of improving the ease of attachment while ensuring a high level of sealing of the cover member 31*a*. It should be noted that the attachment using the hook and loop fastener 38*a* facilitates adjustment of its location, which also improves the convenience.

In the present embodiment, the hook and loop fastener 38*a* is arranged on one side in the thickness direction of the flat plate portion 35*a*. Thus, at the time of attaching the cover member 31*a*, the flat plate portion 35*a* can be utilized to properly attach the hook and loop fastener 38*a* to an installation location. This can further improve the ease of attachment.

In the present embodiment, the hook and loop fastener 38*a* is arranged to surround the opening 36*a*. This can further improve the sealing in the cover member 31*a*. Accordingly, a high level of sealing can be more reliably maintained.

Further, according to the linear motion guide unit 10*a*, as viewed from the rail upper surface 12*a* side in the direction perpendicular to the longitudinal direction, the first opening region 46*a* created when the first right side element 42*a* and the first left side element 43*a* are separated from each other is placed in a position avoiding the rail 11*a*, so even if foreign matter such as dust on the cover member 31*a* enters the inside of the cover member 31*a* when the first right side element 42*a* and the first left side element 43*a* are separated, the risk of the foreign matter reaching the rail 11*a* can be reduced. Consequently, the risk of the foreign matter adhering to the first raceway surfaces 15*a* and 15*b* can be reduced, and in the load-carrying races 18*a* and 18*b* composed of the first raceway surfaces 15*a* and 15*b* and the second raceway surfaces 17*a* and 17*b*, the obstruction of the smooth sliding of the sliding member 21*a* due to the foreign matter can be avoided. Therefore, according to such a linear motion guide unit 10*a*, smooth operation of the sliding member 21*a* can be ensured.

Furthermore, the linear motion guide unit 10*a* includes the second fastener 41*b* having the above configuration. Thus, since the second opening region 46*b* is placed in a position avoiding the rail 11*a*, even if foreign matter enters from the second opening region 46*b*, the risk of the foreign matter adhering to the first raceway surfaces 15*a* and 15*b* can be reduced, thereby ensuring smooth operation of the sliding member 21*a*. In addition, since the moving member 51*a* can be supported by both the first support members 57*a*, 58*a* and the second support members 57*b*, 58*b*, the load applied to the moving member 51*a* can be received in a distributed manner. Accordingly, the load bearing capacity can be improved.

In the present embodiment, the region between the first left side element 43*a* and the second right side element 42*b* is composed of an elastic body. This can suppress sagging or bulging of the region between the first left side element 43*a* and the second right side element 42*b* at the time of disengagement and engagement during the operation of the sliding member 21*a*, thereby reducing the risk of the cover member 31*a* interfering with the rail 11*a* and the sliding member 21*a*.

In the present embodiment, the shielding member 61*a* is attached to the rail side surface 14*a* and is arranged between the rail side surface 14*a* and the first opening region 46*a* of the first fastener 41*a* as viewed from the rail upper surface 12*a* side in the direction perpendicular to the longitudinal direction. In addition, the shielding member 61*b* is attached to the rail side surface 14*b* and is arranged between the rail side surface 14*b* and the second opening region 46*b* of the second fastener 41*b* as viewed from the rail upper surface 12*a* side in the direction perpendicular to the longitudinal direction. Thus, in the regions not covered by the cover member 31*a*, the shielding members 61*a* and 61*b* can reduce the risk of foreign matter entering from the sides of the rail side surfaces 14*a* and 14*b*. Accordingly, the smooth operation of the sliding member 21*a* can be more reliably ensured.

Embodiment 2

Figure 10:
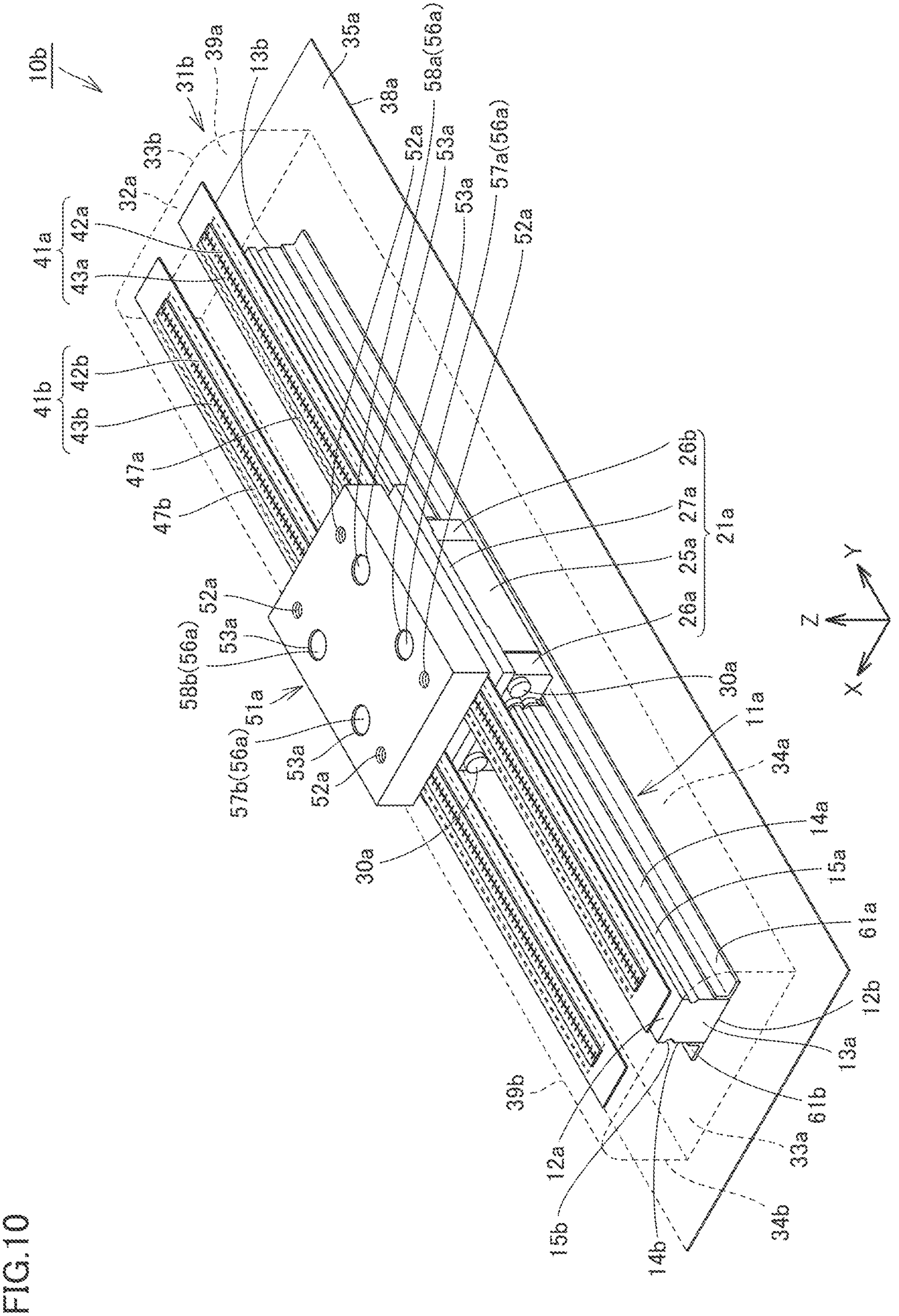
FIG. 10 is a schematic perspective view of a linear motion guide unit in Embodiment 2 of the present disclosure.

Another embodiment, Embodiment 2, will now be described. FIG. 10 is a schematic perspective view of a linear motion guide unit in Embodiment 2 of the present disclosure.

Referring to FIG. 10, in the linear motion guide unit 10*b* of Embodiment 2, an upper wall portion 32*a*, a front side wall portion 33*a*, a back side wall portion 33*b*, a right side wall portion 34*a*, and a left side wall portion 34*b* included in a cover member 31*b* make the inside visible from the outside. Specifically, the upper wall portion 32*a*, the front side wall portion 33*a*, the back side wall portion 33*b*, the right side wall portion 34*a*, and the left side wall portion 34*b* included in the cover member 31*b* are made of a transparent resin. This makes it easier to check the condition of the inside of the cover member 31*b*, and improves maintainability. It should be noted that a configuration making the inside visible is not necessarily provided in all of the upper wall portion 32*a*, the front side wall portion 33*a*, the back side wall portion 33*b*, the right side wall portion 34*a*, and the left side wall portion 34*b* described above. For example, a transparent configuration may be provided in the regions corresponding to the portions 39*a* and 39*b* in Embodiment 1 described above.

Embodiment 3

Figure 11:
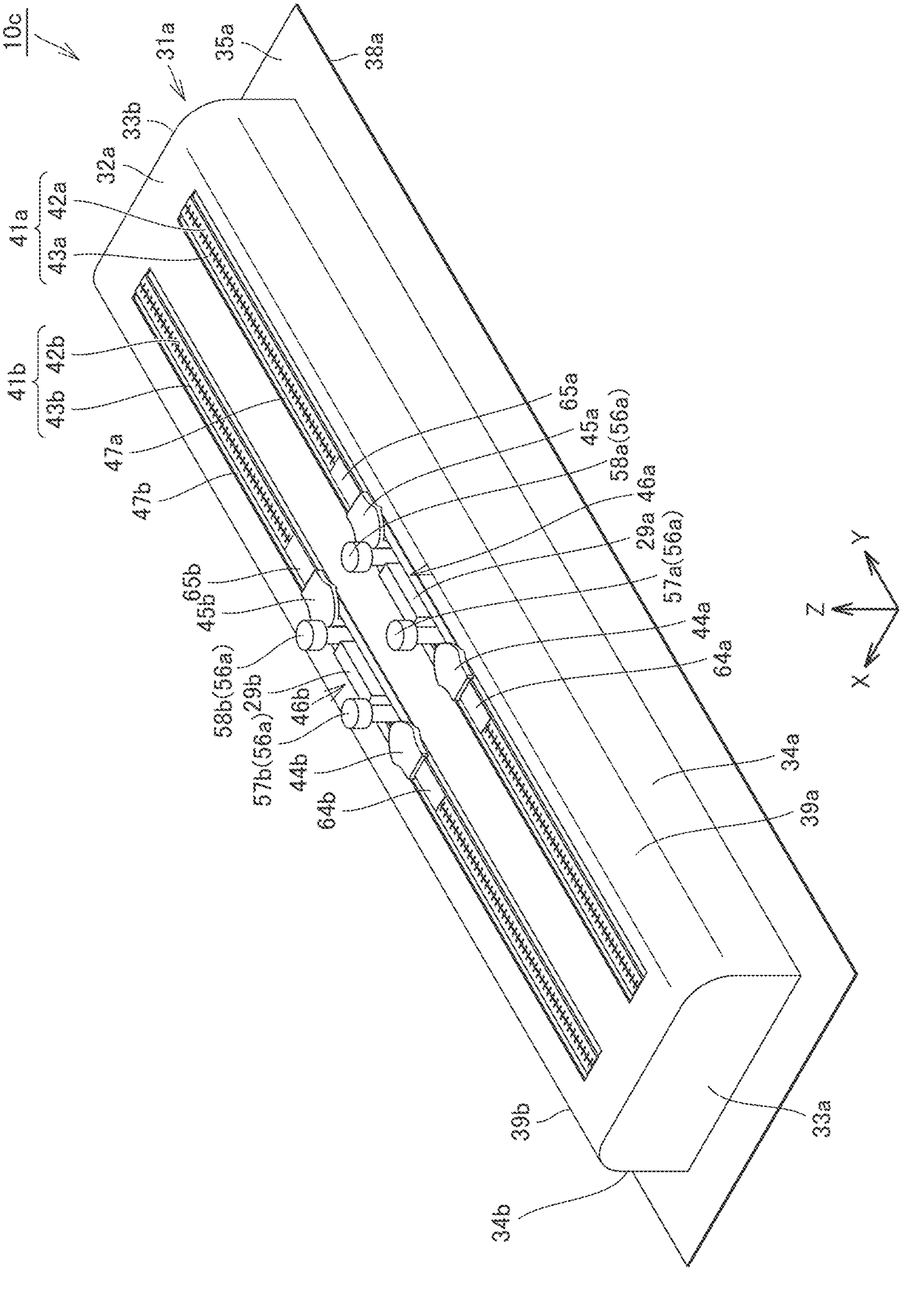
FIG. 11 is a schematic perspective view of a portion of a linear motion guide unit in Embodiment 3 of the present disclosure.

Yet another embodiment, Embodiment 3, will now be described. FIG. 11 is a schematic perspective view of a portion of a linear motion guide unit in Embodiment 3 of the present disclosure. In FIG. 11, the illustration of a moving member is omitted.

Referring to FIG. 11, in the linear motion guide unit 10*c* of Embodiment 3, a first front slider 44*a* and a first rear slider 45*a* have seal members 64*a* and 65*a* that sweep an upper portion of the region where a first right side element 42*a* and a first left side element 43*a* are engaged. A second front slider 44*b* and a second rear slider 45*b* have seal members 64*b* and 65*b* that sweep an upper portion of the region where a second right side element 42*b* and a second left side element 43*b* are engaged. In this configuration, the seal members 64*a* and 65*a* move during the movement of the first front slider 44*a* and the first rear slider 45*a*, and the seal members 64*b* and 65*b* move during the movement of the second front slider 44*b* and the second rear slider 45*b*, so the seal members 64*a*, 65*a*, 64*b*, and 65*b* are capable of reducing the risk of foreign matter deposited on top of the cover member 31*a* entering the inside of the cover member 31*a*. Accordingly, the risk of foreign matter entering the load-carrying races 18*a* and 18*b* can be reduced, and the smooth operation of the sliding member 21*a* can be more reliably ensured.

Embodiment 4

Figure 12:
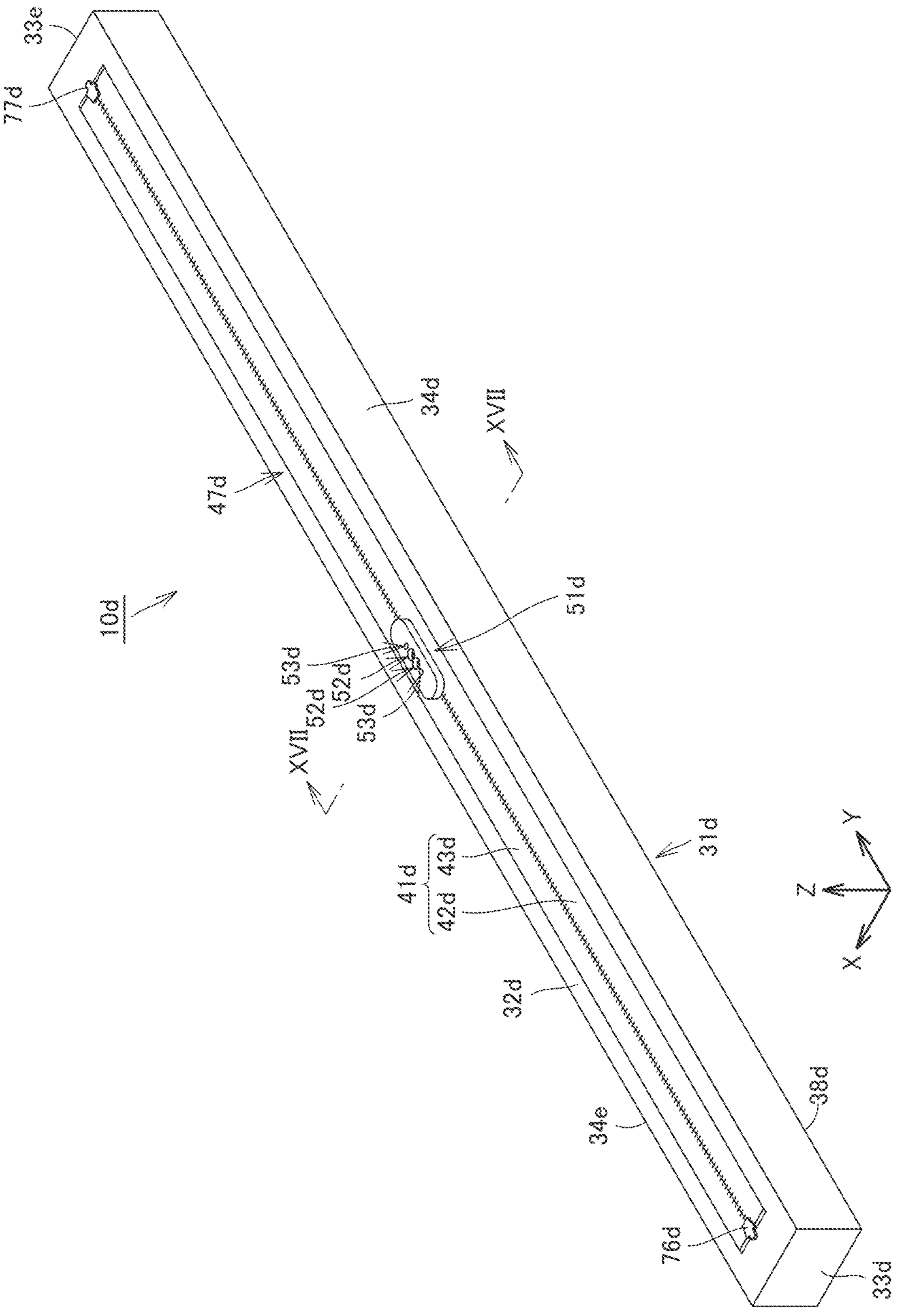
FIG. 12 is a schematic perspective view of a portion of a linear motion guide unit in Embodiment 4 of the present disclosure.
Figure 13:
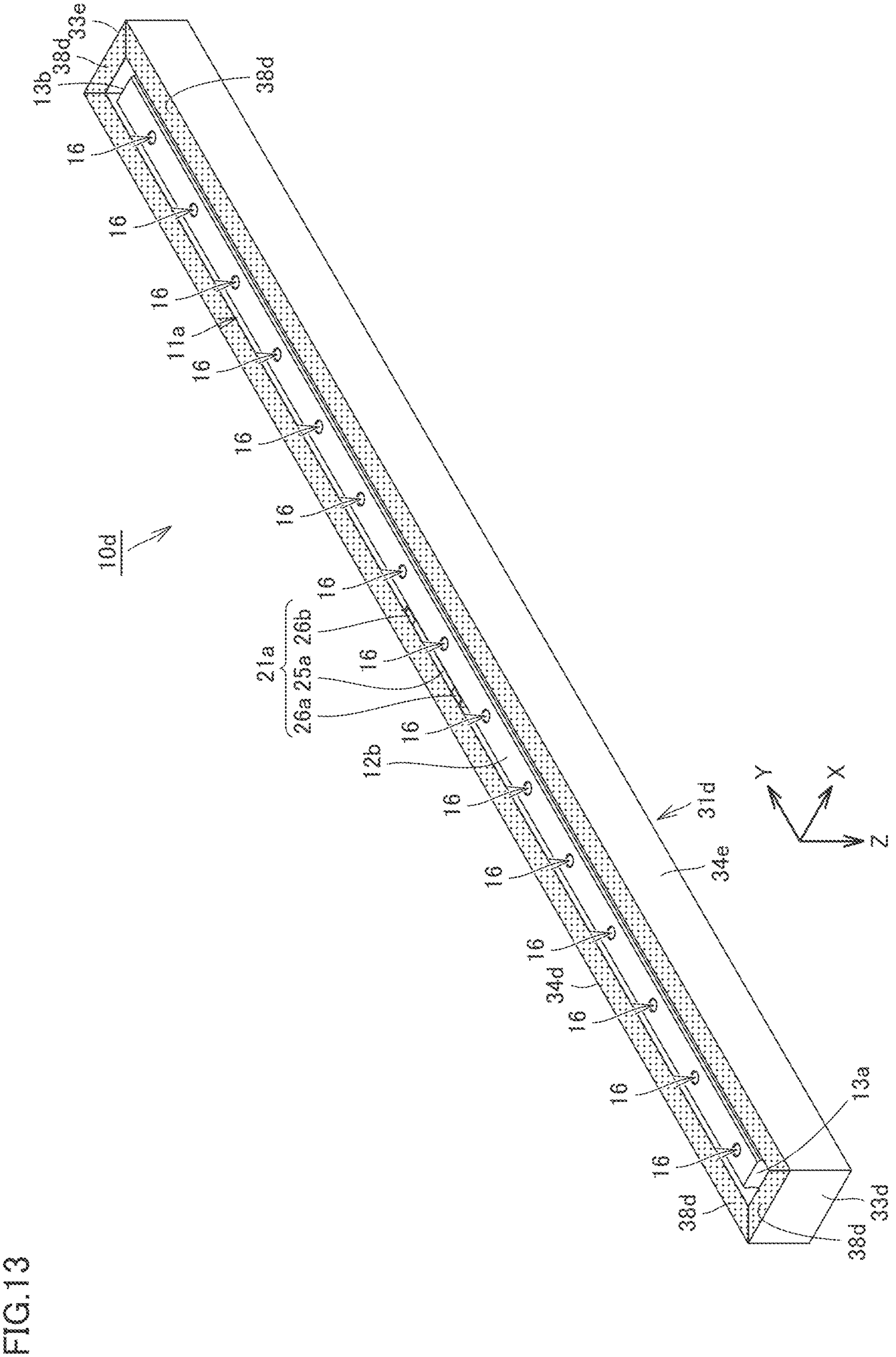
FIG. 13 is a schematic perspective view of a portion of the linear motion guide unit in Embodiment 4 of the present disclosure.
Figure 14:
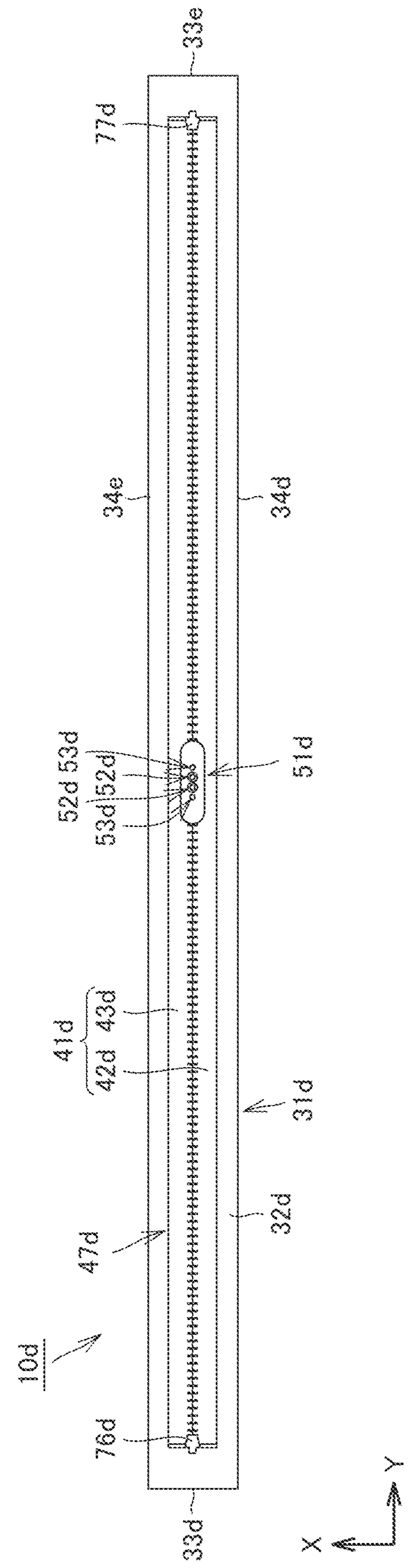
FIG. 14 is a schematic plan view of the linear motion guide unit shown in FIG. 12.
Figure 15:
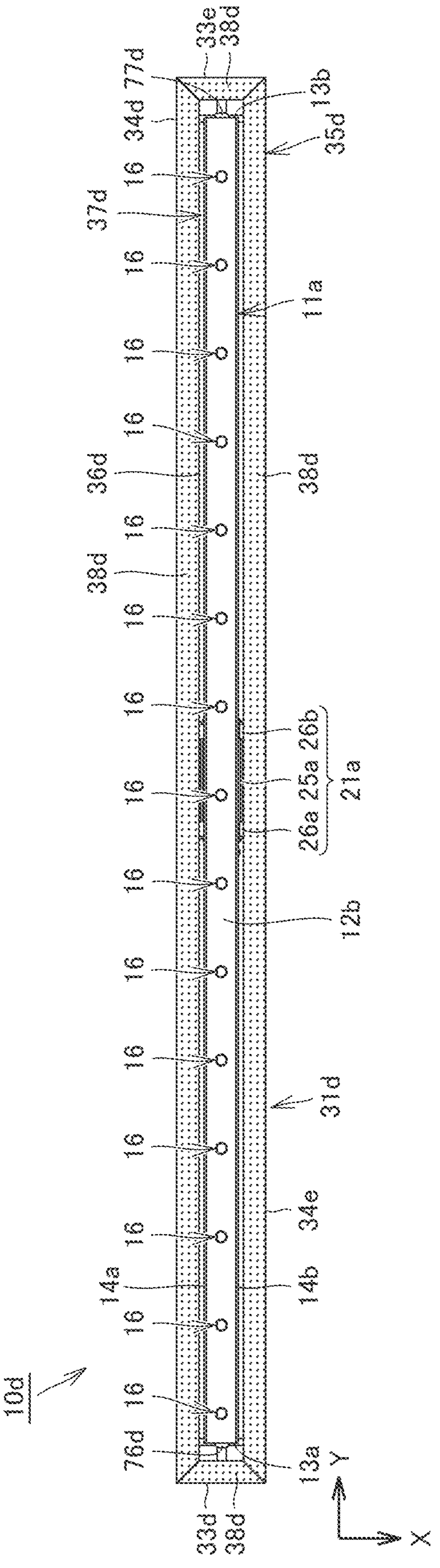
FIG. 15 is a schematic bottom view of the linear motion guide unit shown in FIG. 12.
Figure 16:
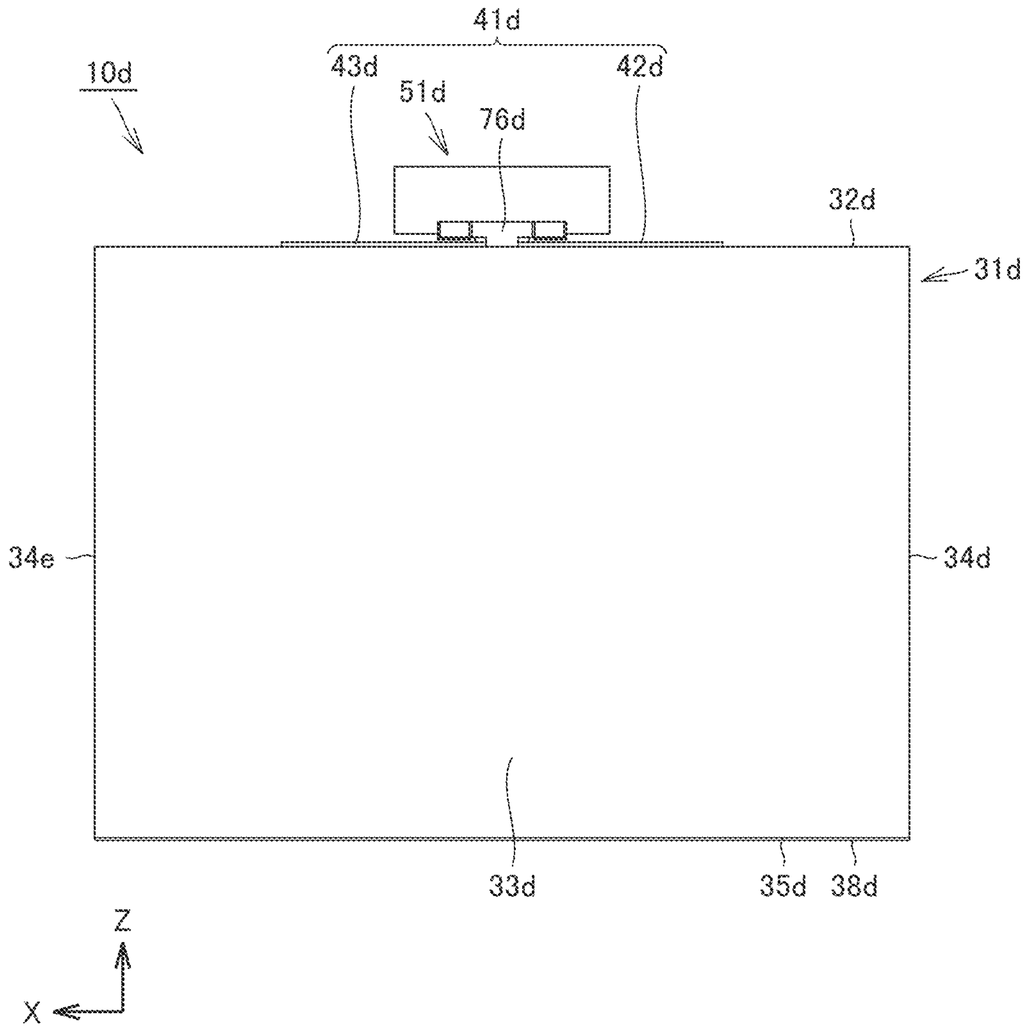
FIG. 16 is a schematic front view of the linear motion guide unit shown in FIG. 12.
Figure 17:
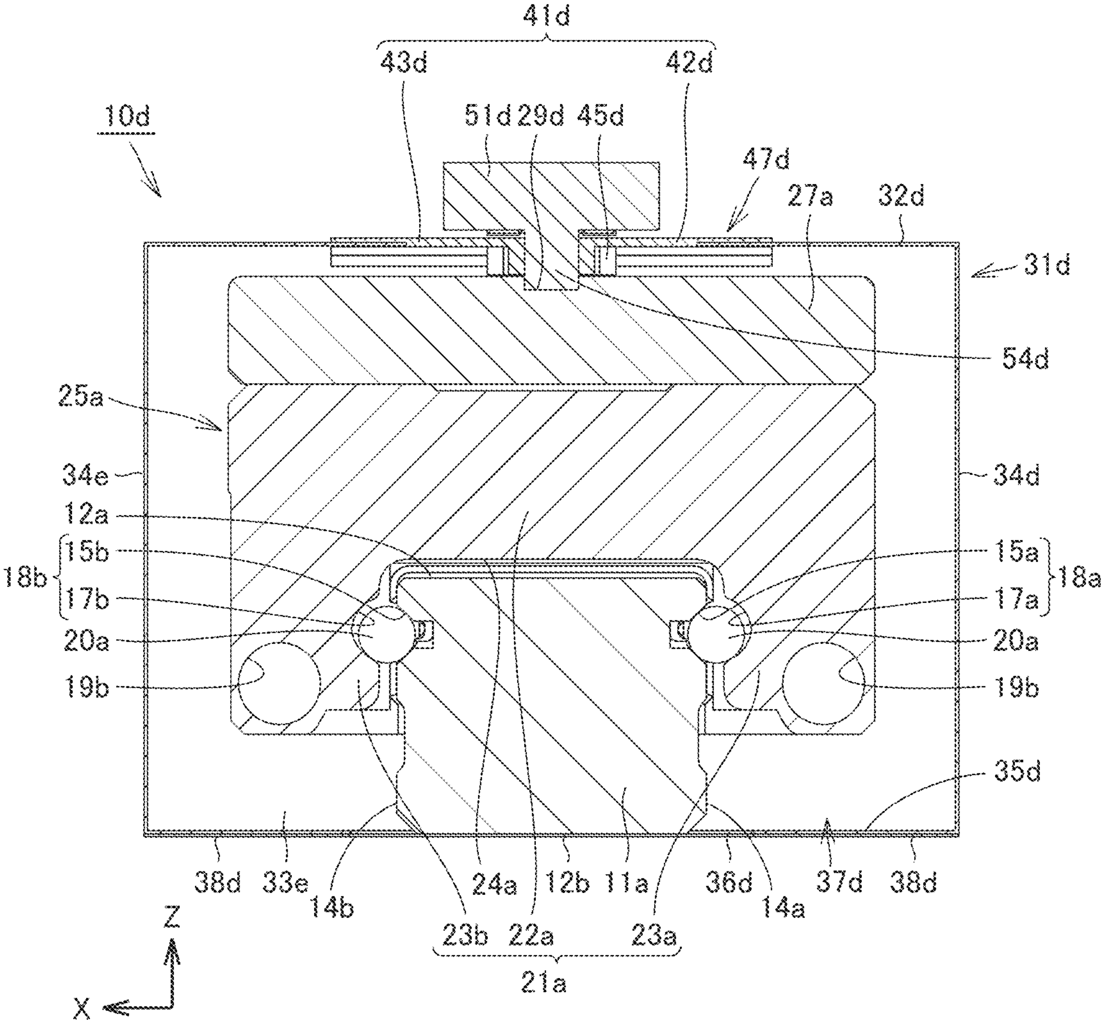
FIG. 17 is a schematic cross-sectional view when cut in a cross section indicated by XVII-XVII in FIG. 2.
Figure 18:
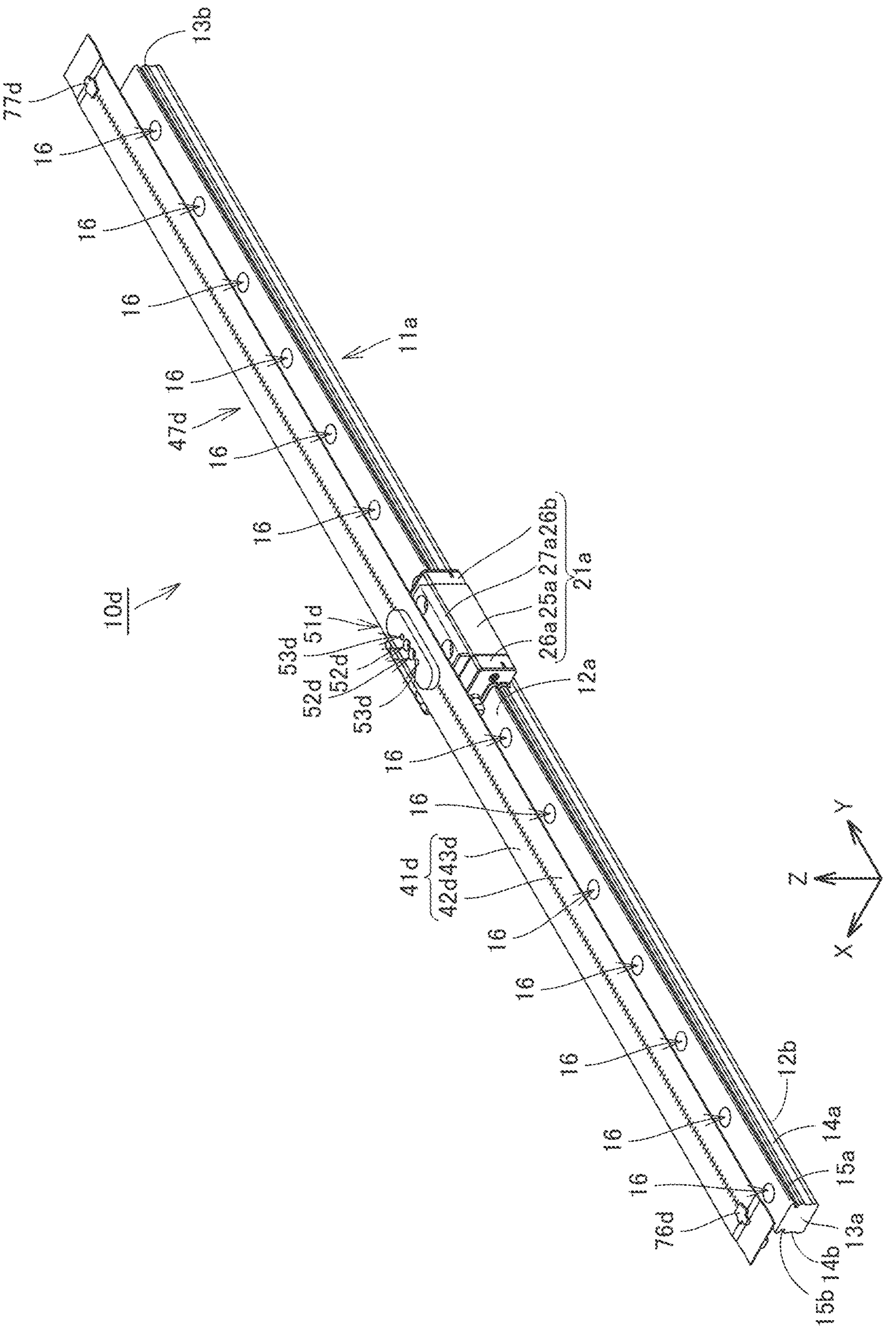
FIG. 18 is a schematic perspective view of the linear motion guide unit shown in FIG. 12, with the illustration of a cover member partially omitted.
Figure 19:
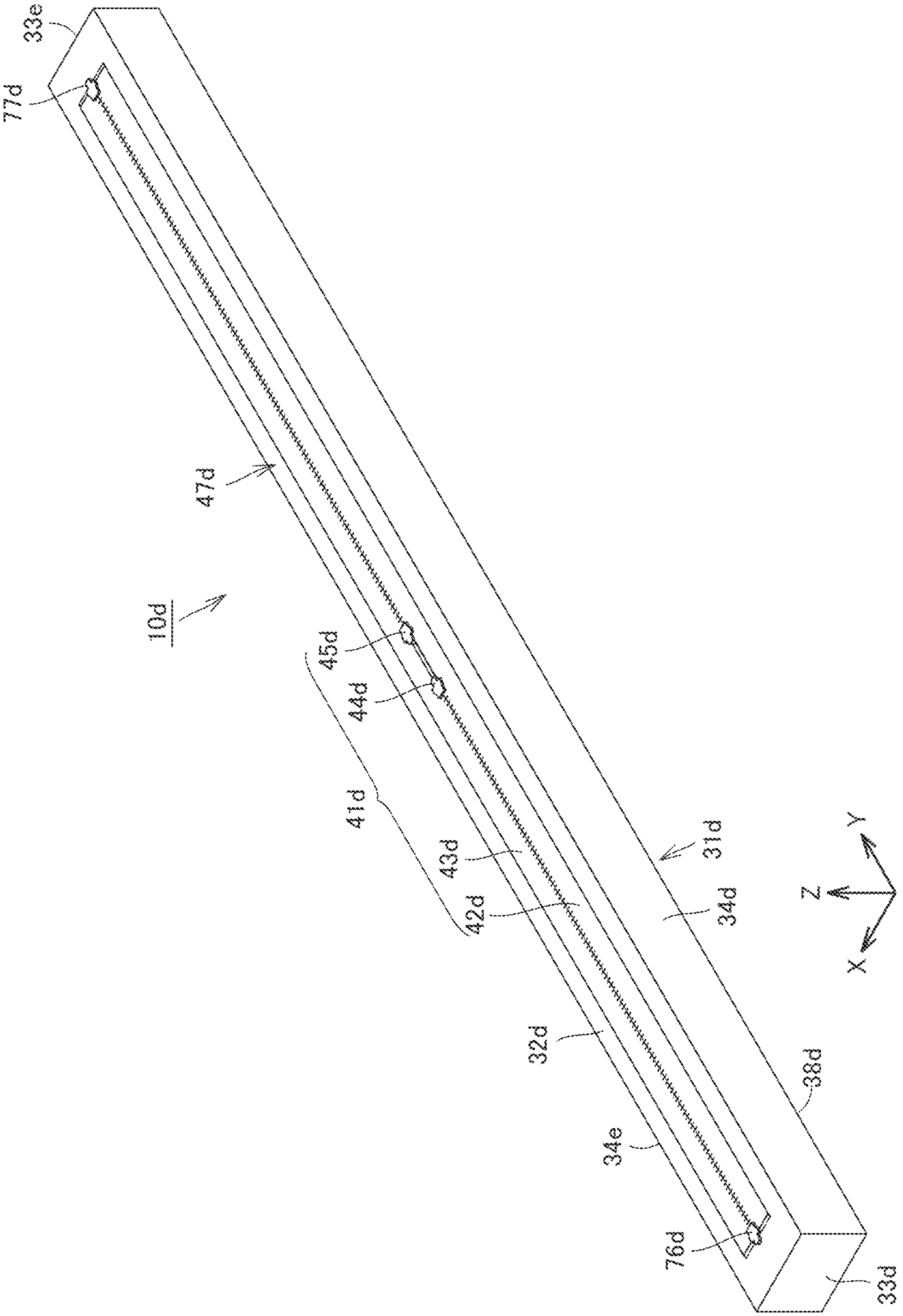
FIG. 19 is a schematic perspective view of the linear motion guide unit shown in FIG. 12, with the illustration of a moving member omitted.
Figure 20:
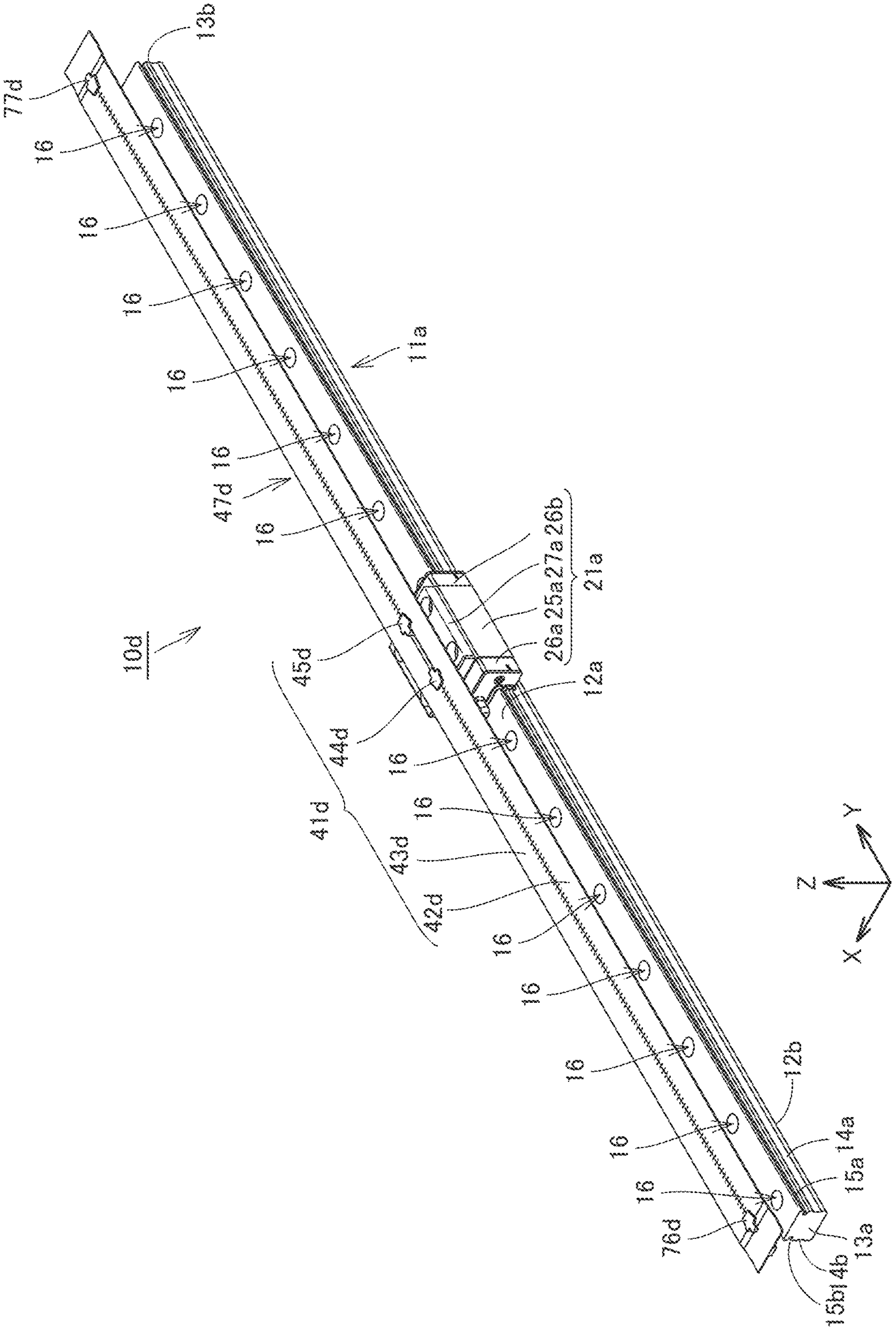
FIG. 20 is a schematic perspective view of the linear motion guide unit shown in FIG. 12, with the illustration of the moving member and a part of the cover member omitted.

Yet another embodiment, Embodiment 4, will now be described. FIGS. 12 and 13 are schematic perspective views of a portion of a linear motion guide unit in Embodiment 4 of the present disclosure. FIGS. 12 and 13 are views in different angles. FIG. 14 is a schematic plan view of the linear motion guide unit shown in FIG. 12. FIG. 15 is a schematic bottom view of the linear motion guide unit shown in FIG. 12. FIG. 16 is a schematic front view of the linear motion guide unit shown in FIG. 12. FIG. 17 is a schematic cross-sectional view when cut in a cross section indicated by XVII-XVII in FIG. 2. FIG. 18 is a schematic perspective view of the linear motion guide unit shown in FIG. 12, with the illustration of a cover member partially omitted. FIG. 19 is a schematic perspective view of the linear motion guide unit shown in FIG. 12, with the illustration of a moving member omitted. FIG. 20 is a schematic perspective view of the linear motion guide unit shown in FIG. 12, with the illustration of the moving member and a part of the cover member omitted. The linear motion guide unit of Embodiment 4 differs from the linear motion guide unit of Embodiment 1 in the number of fasteners, the configuration of the flat plate portion, and others.

Referring to FIGS. 12 to 20, the linear motion guide unit 10*d* of Embodiment 4 includes a rail 11*a*, a sliding member 21*a*, balls 20*a* as the rolling elements, a cover member 31*d*, a moving member 51*d*, and connecting members (not shown). The rail 11*a* includes a rail upper surface 12*a*, a rail lower surface 12*b*, and rail side surfaces 14*a* and 14*b*, each extending in the longitudinal direction. The rail side surfaces 14*a* and 14*b* are provided with first raceway surfaces 15*a* and 15*b*. The basic shape of the rail 11*a* is equivalent to that of Embodiment 1, except for slight differences in the number of through holes 16, the shape of the first raceway surfaces 15*a* and 15*b*, and others. The sliding member 21*a* is relatively movably attached to the rail 11*a*. The sliding member 21*a* includes a sliding member lower surface 24*a* facing the rail upper surface 12*a* and second raceway surfaces 17*a* and 17*b* facing the first raceway surfaces 15*a* and 15*b*. The sliding member 21*a* includes a carriage 25*a*, a front end cap 26*a*, a rear end cap 26*b*, and an intermediate member 27*a*. The basic configuration of the sliding member 21*a* is also equivalent to that of Embodiment 1. The balls 20*a* roll on load-carrying races 18*a* and 18*b* composed of the first raceway surfaces 15*a* and 15*b* and the second raceway surfaces 17*a* and 17*b*. It should be noted that the intermediate member 27*a* included in the sliding member 21*a* is plate-shaped, and is provided with a receiving recess 29*d* for receiving a positioning projection 54*d*, described later, provided in the moving member 51*d*.

The cover member 31*d* covers the rail 11*a* and the sliding member 21*a*. The cover member 31*d* includes a fastener 41*d* extending in the longitudinal direction. The cover member 31*d* includes a flat plate portion 35*d* with an opening 36*d* at the center, a front side wall portion 33*a*, a back side wall portion 33*e*, a right side wall portion 34*d*, and a left side wall portion 34*e* provided so as to rise from the flat plate portion 35*d*, and an upper wall portion 32*d* connected to each of the front side wall portion 33*a*, the back side wall portion 33*e*, the right side wall portion 34*d*, and the left side wall portion 34*e*. The upper wall portion 32*d* has the fastener 41*d* arranged to extend in the longitudinal direction. The rail 11*a* and the sliding member 21*a* are accommodated in a space 37*d* formed in the cover member 31*d*. In the present embodiment, the flat plate portion 35*d* included in the cover member 31*d* has a shape formed by bending, so-called inwardly, one end in the Z direction of each side wall portion, i.e., the front side wall portion 33*a*, the back side wall portion 33*e*, the right side wall portion 34*d*, and the left side wall portion 34*e*. The cover member 31*d* has a rectangular parallelepiped shape with the opening 36*d* arranged at a portion corresponding to the lower side of the rail 11*a*.

The moving member 51*d* is plate-shaped. The moving member 51*d* has a rectangular outer shape longer in the longitudinal direction (Y direction) as viewed in the Z direction. Each end in the longitudinal direction of the moving member 51*d* has an outer shape with rounded corners as viewed in the Z direction. The moving member 51*d* is disposed outside the cover member 31*d*. Specifically, the moving member 51*d* is disposed above the upper wall portion 32*d* of the cover member 31*d*. The moving member 51*a* is arranged on the fastener 41*d*. The moving member 51*d* has a plurality, two in the present embodiment, of attachment holes 52*d*. These attachment holes 52*d* are utilized for attaching a conveying member (not shown) which is conveyed together with the moving member 51*d*. The moving member 51*d* moves together with the sliding member 21*a*. The moving member 51*d* is provided with a plurality of connection holes 53*d* for connecting the member to the sliding member 21*a*, specifically to the intermediate member 27*a* included in the sliding member 21*a*. In the present embodiment, a total of two connection holes 53*d* are provided spaced apart from each other in the Y direction. The moving member 51*a* is also provided with a positioning projection 54*d* projecting from a lower surface located on the rail 11*a* side. This positioning projection 54*d* is shaped to be received in the receiving recess 29*d* provided in the intermediate member 27*a*. The moving member 51*a* is connected and fixed to the intermediate member 27*a* included in the sliding member 21*a* through the connection holes 53*a* by utilizing the connecting members (not shown).

The fastener 41*d*, which is equivalent to the first fastener 41*a* or the second fastener 41*b* in Embodiment 1, includes a right side element 42*d*, a left side element 43*d*, a front slider 44*d*, and a rear slider 45*d*. The right side element 42*d* and the left side element 43*d* each extend in the longitudinal direction and are engageable with each other. The front slider 44*d* and the rear slider 45*d* are each attached to the right side element 42*d* and the left side element 43*d* and fixed to the sliding member 21*a* and the moving member 51*d*. During movement of the sliding member 21*a* and the moving member 51*d*, the front slider 44*d* and the rear slider 45*d* each disengage the right side element 42*d* and the left side element 43*d* from each other while the slider moves in a direction opposite to a side where the other slider is located, and engage the right side element 42*d* and the left side element 43*d* with each other while the slider moves in a direction toward the side where the other slider is located. The fastener 41*d* is formed on a tape member 47*d*, and the tape member 47*d* with the fastener 41*d* formed thereon constitutes a portion of the upper wall portion 32*d* of the cover member 31*d*. In the present embodiment, there is one row of fastener 41*d*, different from the case of Embodiment 1. The fastener 41*d* is disposed at the center in the X direction of the upper wall portion 32*d* as viewed in the Z direction.

It should be noted that in the present embodiment, the cover member 31*d* includes a first auxiliary slider 76*d* and a second auxiliary slider 77*d*. The first auxiliary slider 76*d* and the second auxiliary slider 77*d* are both attached to the right side element 42*d* and the left side element 43*d*. The first auxiliary slider 76*d* is arranged in front of the front slider 44*d*, i.e., on the side of the front side wall portion 33*d*. In the present embodiment, the slider is arranged at the front ends in the longitudinal direction of the right side element 42*d* and the left side element 43*d*. By moving the first auxiliary slider 76*d* in the direction of the arrow Y, the right side element 42*d* and the left side element 43*d* are separated. By moving the first auxiliary slider 76*d* in the direction opposite to the arrow Y, the right side element 42*d* and the left side element 43*d* are engaged. The second auxiliary slider 77*d* is arranged behind the rear slider 45*d*, i.e., on the side of the back side wall portion 33*e*. In the present embodiment, the slider is arranged at the back ends in the longitudinal direction of the right side element 42*d* and the left side element 43*d*. By moving the second auxiliary slider 77*d* in the direction opposite to the arrow Y, the right side element 42*d* and the left side element 43*d* are separated. By moving the second auxiliary slider 77*d* in the direction of the arrow Y, the right side element 42*d* and the left side element 43*d* are engaged. The fastener 41*d* can be opened and closed by utilizing the first auxiliary slider 76*d* and the second auxiliary slider 77*d* configured as described above. The first auxiliary slider 76*d* and the second auxiliary slider 77*d* are effectively utilized by making the fastener 41*d* normally in the closed state, and by opening and closing the fastener 41*d* at the time of cleaning the inside of the cover member 31*d* or other occasions for maintenance of the linear motion guide unit 10*d*.

Here, the flat plate portion 35*d* is provided with a hook and loop fastener 38*d*. The hook and loop fastener 38*d* is disposed on one side in the thickness direction of the flat plate portion 35*d*. In this case, the hook and loop fastener 38*d* is disposed on the rail lower surface side of the rail 11*a*. Further, the hook and loop fastener 38*d* is disposed so as to surround the opening 36*d*. That is, the hook and loop fastener 38*d* is disposed over the entire area of the flat plate portion 35*d*. To attach the cover member 31*d*, the hook and loop fastener 38*d* of the cover member 31*d* is fitted to a hook and loop fastener (not shown) similarly provided at an installation location to thereby attach the cover member 31*d*. In this manner, the cover member 31*d* is fixed to a predetermined installation location. Such attachment using the hook and loop fastener 38*d* provides a freely detachable configuration.

According to the linear motion guide unit 10*d* of the present disclosure, the rail 11*a* and the sliding member 21*a* are accommodated in the space 37*d* formed by the upper wall portion 32*d*, the front side wall portion 33*d*, the back side wall portion 33*e*, the right side wall portion 34*d*, and the left side wall portion 34*e*, so that the cover member 31*d* covers the rail 11*a* and the sliding member 21*a*. During operation of the sliding member 21*a*, i.e., during a linear reciprocating motion of the sliding member 21*a*, the disengagement and engagement of the right side element 42*d* and the left side element 43*d* included in the fastener 41*d* allow the sliding member 21*a* to slide while maintaining the state where the rail 11*a* and the sliding member 21*a* are covered by the cover member 31*d*. This improves the dustproof and waterproof properties during sliding of the sliding member 21*a*. Furthermore, the flat plate portion 35*d* is provided with the hook and loop fastener 38*d*, which eliminates the need for screws, adhesives, or the like for attaching the cover member 31*d*, and facilitates positioning. Since the fastening is done on a surface using the hook and loop fastener 38*d*, a gap is unlikely to occur, and a high level of sealing is maintained in the space 37*d* in which the rail 11*a* and the sliding member 21*a* are housed. Accordingly, the linear motion guide unit 10*d* described above is capable of improving the ease of attachment while ensuring a high level of sealing of the cover member 31*d*. It should be noted that the attachment using the hook and loop fastener 38*d* facilitates adjustment of its location, which also improves the convenience.

Embodiment 5

Figure 21:
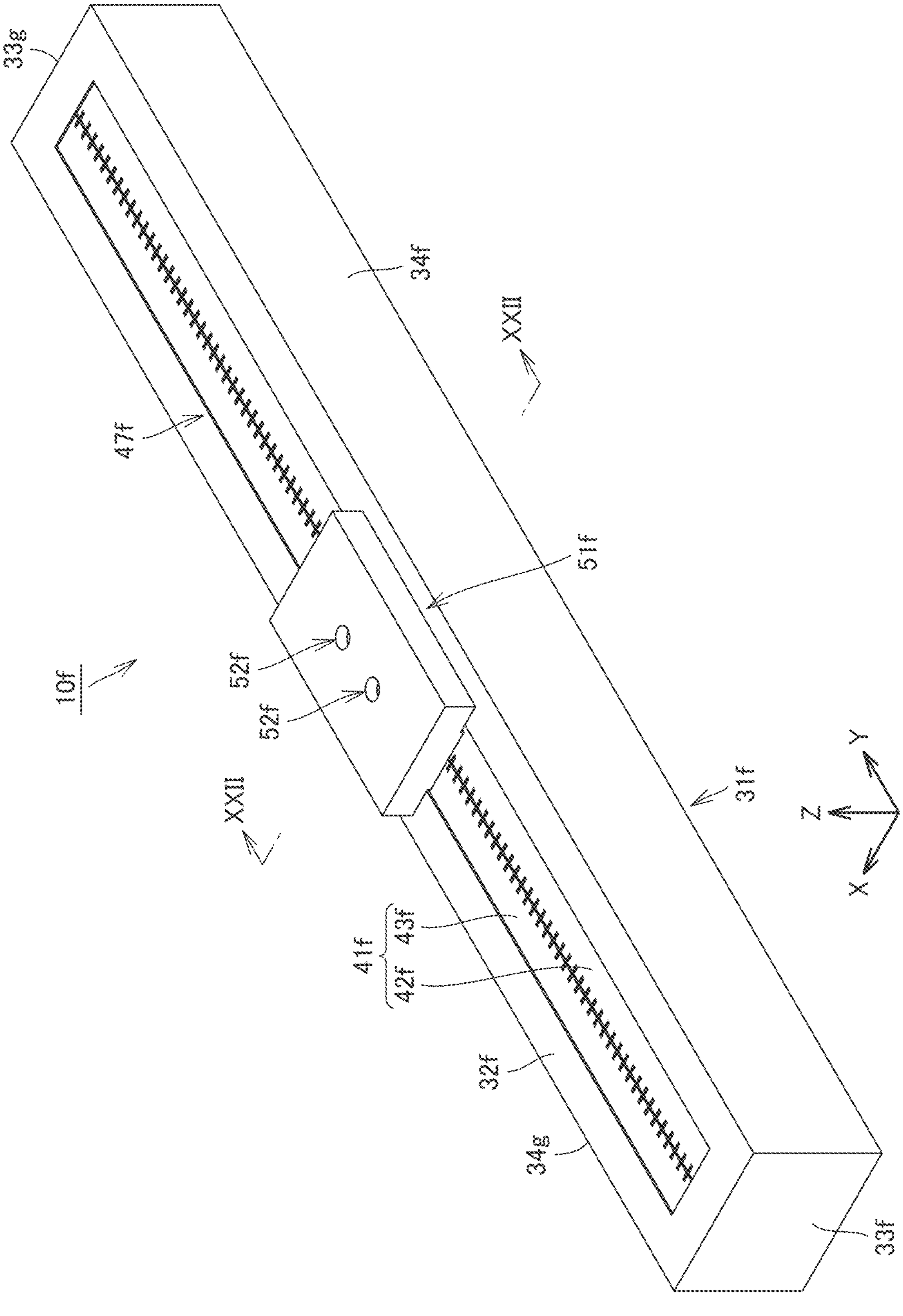
FIG. 21 is a schematic perspective view of a linear motion guide unit in Embodiment 5 of the present disclosure.
Figure 22:
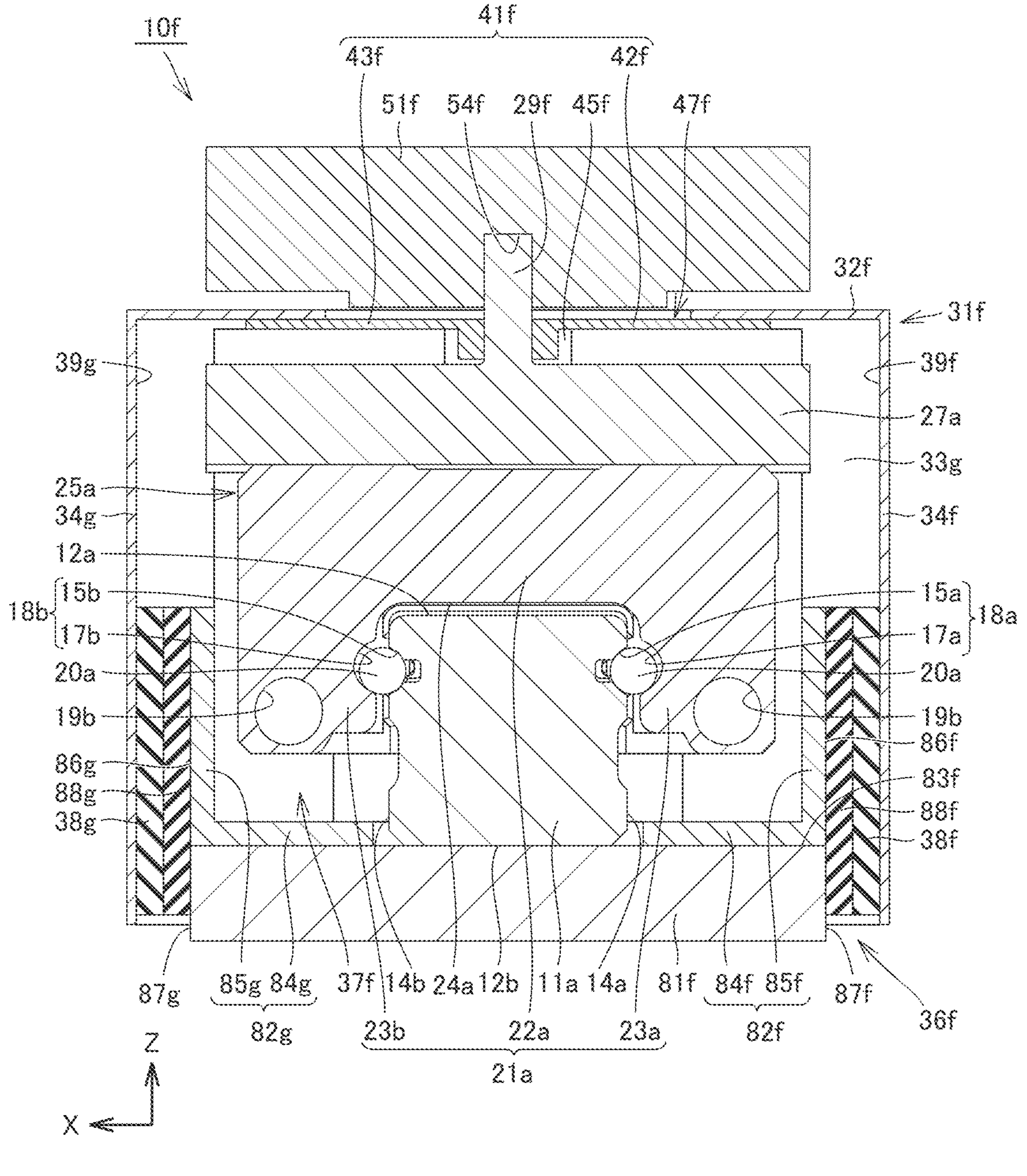
FIG. 22 is a schematic cross-sectional view when cut in a cross section indicated by XXII-XXII in FIG. 21.

Yet another embodiment, Embodiment 5, will now be described. FIG. 21 is a schematic perspective view of a linear motion guide unit in Embodiment 5 of the present disclosure. FIG. 22 is a schematic cross-sectional view when cut in a cross section indicated by XXII-XXII in FIG. 21. The linear motion guide unit of Embodiment 5 differs from the linear motion guide unit of Embodiment 4 in the configuration of the cover member, and others.

Referring to FIGS. 21 and 22, the linear motion guide unit 10*f* of Embodiment 5 includes a rail 11*a*, a sliding member 21*a*, balls 20*a* as the rolling elements, a cover member 31*f* having a fastener 41*f*, a moving member 51*f*, and connecting members (not shown). The rail 11*a* includes a rail upper surface 12*a*, a rail lower surface 12*b*, and rail side surfaces 14*a* and 14*b*, each extending in the longitudinal direction. The rail side surfaces 14*a* and 14*b* are provided with first raceway surfaces 15*a* and 15*b*, respectively. The basic shape of the rail 11*a* is equivalent to that of Embodiment 4. The sliding member 21*a* is relatively movably attached to the rail 11*a*. The sliding member 21*a* includes a sliding member lower surface 24*a* facing the rail upper surface 12*a* and second raceway surfaces 17*a* and 17*b* facing the first raceway surfaces 15*a* and 15*b*. The sliding member 21*a* includes a base portion 22*a* and a pair of sleeve portions 23*a* and 23*b*. The sliding member 21*a* also includes a carriage 25*a*, a front end cap, a rear end cap, and an intermediate member 27*a*. The basic configuration of the sliding member 21*a* is also equivalent to that of Embodiment 1. The balls 20*a* roll on load-carrying races 18*a* and 18*b*, which are composed of the first raceway surfaces 15*a* and 15*b* and the second raceway surfaces 17*a* and 17*b*. It should be noted that the intermediate member 27*a* included in the sliding member 21*a* is plate-shaped, and is provided with a positioning projection 29*f* projecting on the moving member 51*f* side.

The moving member 51*f* is plate-shaped. The moving member 51*f* has a rectangular outer shape longer in the longitudinal direction (Y direction) as viewed in the Z direction. The moving member 51*f* is disposed outside the cover member 31*f*. Specifically, the moving member 51*f* is disposed above an upper wall portion 32*f* of the cover member 31*f*. The moving member 51*f* is arranged on the fastener 41*f*. The moving member 51*f* has a plurality, two in the present embodiment, of attachment holes 52*f*. These attachment holes 52*f* are utilized for attaching a conveying member (not shown) which is conveyed together with the moving member 51*f*. The moving member 51*f* moves together with the sliding member 21*a*. The moving member 51*f* is provided with a plurality of connection holes (not shown) for connecting the member to the sliding member 21*a*, specifically to the intermediate member 27*a* included in the sliding member 21*a*. The moving member 51*f* is also provided with a receiving recess 54*f* recessed from a lower surface located on the rail 11*a* side. This receiving recess 54*f* is shaped to receive the positioning projection 29*f* provided in the intermediate member 27*a*. The moving member 51*f* is connected and fixed to the intermediate member 27*a* included in the sliding member 21*a* through the connection holes by utilizing the connecting members (not shown). It should be noted that the first and second auxiliary sliders as in Embodiment 4 are not provided for the fastener 41*f*.

The cover member 31*f* covers the rail 11*a* and the sliding member 21*a*. The cover member 31*f* includes the fastener 41*f* extending in the longitudinal direction. The cover member 31*f* includes a front side wall portion 33*f*, a back side wall portion 33*g*, a right side wall portion 34*f*, and a left side wall portion 34*g*, and also includes an upper wall portion 32*f* connected to each of the front side wall portion 33*f*, the back side wall portion 33*g*, the right side wall portion 34*f*, and the left side wall portion 34*g*. The fastener 41*f* includes a right side element 42*f*, a left side element 43*f*, a front slider, and a rear slider. The fastener 41*f* is formed on a tape member 47*f*, and the tape member 47*f* with the fastener 41*f* formed thereon constitutes a portion of the upper wall portion 32*f* of the cover member 31*f*. In the present embodiment, the cover member 31*f* does not include a flat plate portion of Embodiment 4. The rail 11*a* and the sliding member 21*a* are accommodated in a space 37*f* provided in the cover member 31*f*. The cover member 31*f* has a rectangular parallelepiped shape with an opening 36*f* provided at a portion corresponding to the lower side of the rail 11*a*.

The cover member 31*f* also includes a base plate 81*f* having a rectangular shape as viewed in the thickness direction (Z direction), and a pair of mounting plates 82*f* and 82*g* attached to the base plate 81*f*. The base plate 81*f* extends in the longitudinal direction (Y direction) so as to block the opening 36*f*. The base plate 81*f* includes a side surface 87*f* located on one side in the X direction and a side surface 87*g* located on the other side in the X direction. The base plate 81*f* is configured to have a longitudinal length that is equal to a longitudinal length of the opening 36*f* of the cover member 31*f*. The rail 11*a* is attached to the base plate 81*f*. Specifically, the rail is attached by bolts, not shown, in such a manner that the rail lower surface 12*b* faces one side in the thickness direction of the base plate 81*f*, which in this case is a base plate upper surface 83*f* located on the space 37*f* side. In this case, a plurality of through holes 16 provided in the rail 11*a* are utilized. The rail 11*a* is attached to the base plate 81*f* so as to be centered in the lateral direction (X direction).

The mounting plates 82*f* and 82*g* each have a shape obtained by bending a thin plate-shaped member at a right angle, and extend in the longitudinal direction. The mounting plates 82*f* and 82*g* are also attached to the base plate 81*f* by bolts, not shown, or the like. In the present embodiment, the mounting plates 82*f* and 82*g* are attached so as to sandwich the rail 11*a* therebetween in the X direction. The mounting plate 82*f* includes a first portion 84*f* which is parallel to the X-Y plane, and a second portion 85*f* which is parallel to the Y-Z plane. The mounting plate 82*f* is attached such that the first portion 84*f* is in contact with the base plate upper surface 83*f* and the second portion 85*f* rises in the Z direction in the space 37*f*. Similarly, the mounting plate 82*g* includes a first portion 84*g* parallel to the X-Y plane and a second portion 85*g* parallel to the Y-Z plane, and is attached such that the first portion 84*g* is in contact with the base plate upper surface 83*f* and the second portion 85*g* rises in the Z direction in the space 37*f*. In the state where the mounting plates 82*f* and 82*g* are attached, one sleeve portion 23*a* of the sliding member 21*a* is arranged between the rail 11*a* and the second portion 85*f*, and the other sleeve portion 23*b* of the sliding member 21*a* is arranged between the rail 11*a* and the second portion 85*g*. The plates are also arranged such that a side surface 86*f* of the second portion 85*f* faces an inner wall surface 39*f* of the right side wall portion 34*f* located on the space 37*f* side, and that a side surface 86*g* of the second portion 85*g* faces an inner wall surface 39*g* of the left side wall portion 34*g* located on the space 37*f* side.

The side surface 86*f* of the second portion 85*f* has a hook and loop fastener 88*f* attached thereto. The side surface 86*g* of the second portion 85*g* has a hook and loop fastener 88*g* attached thereto. These hook and loop fasteners 88*f* and 88*g* are disposed over the entire areas in the Y and Z directions of the second portions 85*f* and 85*g*, respectively. The hook and loop fasteners 88*f* and 88*g* are arranged to extend halfway down the side surfaces 87*f* and 87*g* in the X direction of the base plate 81*f*.

Here, the cover member 31*f* has hook and loop fasteners 38*f* and 38*g* attached to the wall thereof, specifically to the right side wall portion 34*f* and the left side wall portion 34*g*. In the present embodiment, the hook and loop fastener 38*f* is attached to the inner wall surface 39*f* of the right side wall portion 34*f*, and the hook and loop fastener 38*g* is attached to the inner wall surface 39*g* of the left side wall portion 34*g* located on the space 37*f* side. In other words, unlike the cases of Embodiments 1 to 4, the hook and loop fasteners 38*f* and 38*g* are each provided parallel to the Y-Z plane. The hook and loop fasteners 38*f* and 38*g* are disposed over the entire areas in the Y direction of the inner wall surfaces 39*f* and 39*g*. The hook and loop fasteners 38*f* and 38*g* are arranged to extend from the ends of the inner wall surfaces 39*f* and 39*g* on the opening 36*f* side to halfway in the Z direction. The hook and loop fasteners 38*f* and 38*g* have their lengths in the Y direction and the Z direction equal to those of the hook and loop fasteners 88*f* and 88*g*, respectively.

The cover member 31*f* is attached to the base plate 81*f* and the mounting plates 82*f*, 82*g* by fitting the hook and loop fastener 88*f* to the hook and loop fastener 38*f* and the hook and loop fastener 88*g* to the hook and loop fastener 38*g*. That is, the cover member 31*f* is fixed to the base plate 81*f* and the mounting plates 82*f*, 82*g* by fitting the hook and loop fastener 38*f* and the hook and loop fastener 88*f* to each other and the hook and loop fastener 38*g* and the hook and loop fastener 88*g* to each other in the X direction. In this manner, the risk of foreign matter such as dust accumulating on the portions where the hook and loop fasteners 38*f*, 38*g* are disposed can be reduced. Accordingly, the risk of the foreign matter entering the cover member 31*f* can be reduced, and the smooth operation of the sliding member 21*a* can be more reliably ensured.

In this case, the hook and loop fastener 38*f* and the hook and loop fastener 38*g* can be fitted to the hook and loop fastener 88*f* and the hook and loop fastener 88*g*, respectively, to block the opening 36*f*. This can improve the sealing of the space 37*f* in the cover member 31*f*, thereby ensuring smooth sliding of the sliding member 21*a*.

OTHER EMBODIMENTS

While balls are used as the rolling elements in the above embodiments, the rolling elements are not limited thereto; rollers may be used as the rolling elements.

Further, while one or two rows of fasteners are provided in the above embodiments, the configuration is not limited thereto; three or more rows of fasteners may be provided.

While the hook and loop fastener is provided over the entire area on one side in the thickness direction of the flat plate portion in the above embodiments, the configuration is not limited thereto; the hook and loop fastener may be provided at a portion on one side in the thickness direction of the flat plate portion.

It should be noted that in the above embodiments, at least one of the right side element and the left side element may include an oil-containing resin provided at the portion where the elements are engaged with each other. This can promote the smooth movement of the right side element and the left side element, and the smooth operation of the sliding member can be ensured.

It should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST

10*a*, 10*b*, 10*c*, 10*d*, 10*f*: linear motion guide unit; 11*a*: rail; 12*a*: rail upper surface; 12*b*: rail lower surface; 13*a*: rail front surface; 13*b*: rail back surface; 14*a*, 14*b*: rail side surface; 15*a*, 15*b*: first raceway surface; 16: through hole; 17*a*, 17*b*: second raceway surface; 18*a*, 18*b*: load-carrying race; 19*a*, 19*b*: return passage; 20*a*: ball; 21*a*: sliding member; 22*a*: base portion; 23*a*, 23*b*: sleeve portion; 24*a*: sliding member lower surface; 25*a*: carriage; 26*a*: front end cap; 26*b*: rear end cap; 27*a*: intermediate member; 29*a*, 29*b*, 29*f*, 54*d*: positioning projection; 29*d*, 54*a*, 54*b*, 54*f*: receiving recess; 31*a*, 31*b*, 31*d*, 31*f*: cover member; 32*a*, 32*d*, 32*f*: upper wall portion; 33*a*, 33*d*, 33*f*: front side wall portion; 33*b*, 33*e*, 33*g*: back side wall portion; 34*a*, 34*d*, 34*f*: right side wall portion; 34*b*, 34*e*, 34*g*: left side wall portion; 35*a*, 35*d*: flat plate portion; 36*a*, 36*d*, 36*f*: opening; 37*a*, 37*d*, 37*f*: space; 38*a*, 38*d*, 38*f*, 38*g*, 88*f*, 88*g*: hook and loop fastener; 39*a*, 39*b*: portion; 39*f*, 39*g*: inner wall surface; 41*a*: fastener (first fastener); 41*b*: fastener (second fastener); 41*d*, 41*f*: fastener; 42*a*: right side element (first right side element); 42*b*: right side element (second right side element); 42*d*, 42*f*: right side element; 43*a*: left side element (first left side element); 43*b*: left side element (second left side element); 43*d*, 43*f*: left side element; 44*a*: front slider (first front slider); 44*b*: front slider (second front slider); 44*d*: front slider; 45*a*: rear slider (first rear slider); 45*b*: rear slider (second rear slider); 45*d*: rear slider; 46*a*: opening region (first opening region); 46*b*: opening region (second opening region); 47*a*: tape member (first tape member); 47*b*: tape member (second tape member); 47*d*, 47*f*: tape member; 51*a*, 51*d*, 51*f*: moving member; 52*a*, 52*d*, 52*f*: attachment hole; 53*a*, 53*d*: connection hole; 56*a*: connecting member; 57*a*, 58*a*: first support member; 57*b*, 58*b*: second support member; 61*a*, 61*b*: shielding member; 64*a*, 64*b*, 65*a*, 65*b*: seal member; 76*d*: first auxiliary slider; 77*d*: second auxiliary slider; 81*f*: base plate; 82*f*, 82*g*: mounting plate; 83*f*: base plate upper surface; 84*f*, 84*g*: first portion; 85*f*, 85*g*: second portion, and 86*f*, 86*g*, 87*f*, 87*g*: side surface.

The invention claimed is:

1. A cover member including a longitudinally extending fastener and covering a mechanical element component, the cover member comprising:

a wall having the fastener arranged thereon and forming a space for accommodating the mechanical element component; wherein the fastener includes a right side element extending along the longitudinal direction, a left side element extending in the longitudinal direction along the right side element and engageable with the right side element, a front slider attached to the right side element and the left side element, and a rear slider attached to the right side element and the left side element and spaced apart from the front slider in the longitudinal direction, during movement of the front slider and the rear slider in the longitudinal direction, the front slider and the rear slider each disengages the right side element and the left side element from each other while the slider moves in a direction opposite to a side where the other slider is located, and engages the right side element and the left side element with each other while the slider moves in a direction toward the side where the other slider is located, the wall has a hook and loop fastener provided thereon, and at least a portion of the cover member includes a structure made of a plurality of resin materials of different strengths that are stacked.

2. A linear motion guide unit comprising:

a rail including a rail upper surface and a rail side surface each extending in a longitudinal direction, the rail having a first raceway surface provided on the rail side surface;

a sliding member relatively movably attached to the rail, the sliding member including a sliding member lower surface facing the rail upper surface and a second raceway surface facing the first raceway surface;

a plurality of rolling elements rolling on a load-carrying race constituted by the first and second raceway surfaces;

a cover member covering the rail and the sliding member, the cover member including a fastener extending in the longitudinal direction;

a moving member arranged outside the cover member and moving together with the sliding member; and a connecting member connecting the sliding member to the moving member; wherein the cover member includes a wall that has the fastener arranged thereon and forms a space for accommodating the rail and the sliding member, the fastener includes a right side element that extends along the longitudinal direction, a left side element that extends in the longitudinal direction along the right side element and is engageable with the right side element, a front slider attached to the right side element and the left side element and fixed to the sliding member and the moving member, and a rear slider attached to the right side element and the left side element, spaced apart from the front slider in the longitudinal direction, and fixed to the sliding member and the moving member, during movement of the sliding member and the moving member, the front slider and the rear slider each disengages the right side element and the left side element from each other while the slider moves in a direction opposite to a side where the other slider is located, and engages the right side element and the left side element with each other while the slider moves in a direction toward the side where the other slider is located, the connecting member includes a support member arranged between the front slider and the rear slider in the longitudinal direction and supporting the moving member, the wall has a hook and loop fastener provided thereon, and at least a portion of the cover member includes a structure made of a plurality of resin materials of different strengths that are stacked.

3. The linear motion guide unit according to claim 2, wherein the wall includes a flat plate portion, and the hook and loop fastener is arranged on one side in a thickness direction of the flat plate portion.

4. The linear motion guide unit according to claim 3, wherein the wall has an opening communicating with the space, and the hook and loop fastener is arranged to surround the opening.

5. The linear motion guide unit according to claim 3, wherein the wall includes an upper wall portion on which the fastener is arranged, and a side wall portion that extends intersecting the upper wall portion, and the hook and loop fastener is attached to the side wall portion.

6. The linear motion guide unit according to claim 3, wherein at least a portion of the cover member makes an inside visible from an outside.

7. The linear motion guide unit according to claim 3, wherein at least one of the front slider and the rear slider has a seal member operative to sweep an upper portion of a region in which the right side element and the left side element are engaged.

8. The linear motion guide unit according to claim 3, wherein the wall includes an upper wall portion on which the fastener is arranged, and a side wall portion that extends intersecting the upper wall portion, and a portion where the upper wall portion and the side wall portion are connected is configured with a curved surface.

9. The linear motion guide unit according to claim 3, wherein at least one of the right side element and the left side element includes an oil-containing resin provided at a portion where the elements are engaged with each other.

10. The linear motion guide unit according to claim 2, wherein the wall has an opening communicating with the space, and the hook and loop fastener is arranged to surround the opening.

11. The linear motion guide unit according to claim 2, wherein the wall includes an upper wall portion on which the fastener is arranged, and a side wall portion that extends intersecting the upper wall portion, and the hook and loop fastener is attached to the side wall portion.

12. The linear motion guide unit according to claim 2, wherein at least a portion of the cover member makes an inside visible from an outside.

13. The linear motion guide unit according to claim 2, wherein at least one of the front slider and the rear slider has a seal member operative to sweep an upper portion of a region in which the right side element and the left side element are engaged.

14. The linear motion guide unit according to claim 2, wherein the wall includes an upper wall portion on which the fastener is arranged, and a side wall portion that extends intersecting the upper wall portion, and a portion where the upper wall portion and the side wall portion are connected is configured with a curved surface.

15. The linear motion guide unit according to claim 2, wherein at least one of the right side element and the left side element includes an oil-containing resin provided at a portion where the elements are engaged with each other.

* * * * *